United States Patent
Harmon

Patent Number: 6,002,640
Date of Patent: Dec. 14, 1999

[54] SEISMIC DATA ACQUISITION SYSTEM

[75] Inventor: Jerald L. Harmon, Sugar Land, Tex.

[73] Assignee: Geo-X Systems, Inc., Calgary, Canada

[21] Appl. No.: 09/075,968

[22] Filed: May 11, 1998

Related U.S. Application Data

[60] Provisional application No. 60/046,613, May 15, 1997.
[51] Int. Cl.[6] .................................................. G01V 1/20
[52] U.S. Cl. .................. 367/38; 367/76; 367/79; 367/55; 367/56
[58] Field of Search ........................ 367/38, 41, 42, 367/57, 56, 49, 76, 79, 55

[56] References Cited

U.S. PATENT DOCUMENTS

| | | | |
|---|---|---|---|
| 3,717,844 | 2/1973 | Barret et al. | 340/5 R |
| 3,878,502 | 4/1975 | Rochelle | 340/5 R |
| 3,972,019 | 7/1976 | Bassett | 340/15.5 |
| 4,281,403 | 7/1981 | Siems et al. | 367/76 |
| 4,807,200 | 2/1989 | Montes et al. | 367/76 |
| 5,648,938 | 7/1997 | Jakubowicz | 367/56 |

FOREIGN PATENT DOCUMENTS

| | | |
|---|---|---|
| 1206967 | 9/1970 | United Kingdom . |
| 2057733 | 4/1981 | United Kingdom . |

*Primary Examiner*—Christine Oda
*Assistant Examiner*—Anthony Jolly
*Attorney, Agent, or Firm*—Conley, Rose & Tayon; Robert M. Gray

[57] ABSTRACT

A seismic data acquisition system is featured that utilizes a series of nearly identical seismic shots (SISS) to synchronize and to communicate with novel data acquisition units (NDAU) located in the field. Each SISS seismic shot is carefully timed to provide synchronization to each NDAU, and to allow the NDAU to correct for the time drift of its internal clock. Further, each NDAU is programmed with a number of menus, which are used to interpret the seismic shots received from a seismic source. Thus, communication from a central or headquarter site to each NDAU is facilitated, allowing for a change in production schedule and other variables. In addition, the disclosed seismic data acquisition system features movable SISS source sites and overlapping production and SISS shots.

38 Claims, 9 Drawing Sheets

SEISMIC DATA ACQUISITION SYSTEM

CROSS-REFERENCE TO RELATED APPLICATIONS

This application claims the benefit of U.S. provisional application Ser. No. 60/046,613, filed May 15, 1997.

STATEMENT REGARDING FEDERALLY SPONSORED RESEARCH OR DEVELOPMENT

Not Applicable.

BACKGROUND OF THE INVENTION

Those in the energy industry are particularly concerned with the character and contents of rock formations underground. This is because once the nature of a geological formation is known, the prospects for finding and retrieving hydrocarbons from that formation may be determined. However, drilling a well bore in the ground is expensive and is best at yielding information regarding the formation immediately surrounding the well bore. Therefore, some non-invasive technique is preferable to determine the nature of underground lithologies over a large area. In response, non-invasive exploration seismology techniques have been developed.

Exploration seismology deals with artificially generating sonic or seismic waves to locate and define mineral deposits such as hydrocarbons, ores, water, geothermal reservoirs, and archeological sites. Exploration seismology also may be used to obtain geological information for engineering. As such, exploration seismology provides data that would be used in conjunction with other geophysical, borehole, and geological data to make conclusions about the structure and distribution of underground or undersea lithologies.

Methods developed for exploration seismology have been extended and applied to petroleum field development in applications such as reservoir characterization and reservoir monitoring. The seismic reflection method is one major type of applied seismology used for exploration and field development. Essentially, the seismic reflection method involves measuring the time required for seismic waves to travel through a rock formation from a surface-based acoustic source to a remote surface-based seismic receiver. Also measured are various other parameters of the received seismic signals. With this knowledge of the travel times to various seismic receivers and other parameters, the paths of the seismic waves may be reconstructed. This and other knowledge helps to determine what lies beneath the surface of the earth in an area surrounding the seismic source and receiver. Likewise, an analogous approach is used for marine exploration seismology.

FIG. 1 shows a cut-away view of a rock formation 100 including upper lithology 110 and lower lithology 120. Also shown is acoustic or seismic source 130 and seismic receivers 140, 142 and 144 arrayed in a straight line with regard to seismic source 130. Seismic receivers 140, 142, 144 connect by means of wire or fiber-optic cable (not shown in FIG. 1) to each other and to a data acquisition unit (DAU) 180. Seismic source 130, seismic receivers 140, 142 and 144, and DAU 180 are all typically positioned at or near the earth's surface for land-based applications. For marine-based applications, these elements are typically at or near the surface of a body of water, such as the ocean, or may be placed near the water bottom.

Seismic source 130 generates seismic waves characterized by ray paths 150, 160, 170 at a recorded time $t_0$. Many different types of source systems are used in the industry for different kinds of seismic surveys. These source systems may be categorized in a variety of ways, such as by marine or land type, by impulse or non-impulse type, by distributed or non-distributed type, or by source strength.

Impulse source methods release a sudden burst of energy (generally less than 50 msec) from the seismic source. This generates a short source wavelet (generally less than 200 msec in duration). One common approach to creating such an impulsive seismic wave is to position explosives in multiple drilled or flushed holes, and to detonate them singly or simultaneously. Another approach is the airgun method, which is the dominant method for areas with appreciable water depth such as most offshore surveys. Airguns have also been successfully employed in shallow water. Land airgun systems include a vehicle-mounted system in which the airgun is contained in a hemispherically shaped water-filled container and an auger mountedairgun or "mudgun".

One non-impulsive method used for surveys in land, and occasionally marine, environments is the Vibroseis method. As is well known by those of ordinary skill in the art, it is characterized by a relatively low-energy long duration wavelet of from 5 to 25 seconds in length. Sources for shallow surveys such as site surveys may use low-energy methods even including use of a sledge hammer. In selecting the source to use for a particular survey the energy level, cost, environmental considerations, mobility, terrain type and geophysical characteristics and objectives must be considered.

In any case, seismic waves with ray paths 150, 160, 170 travel through upper rock formation 110 at a first velocity $V_1$, corresponding to the elastic properties and character of lithology 110. Upon arrival at the interface 115 between rock formation 110 and rock formation 120, seismic waves depicted by ray paths 150, 160, and 170 split into reflected and refracted portions according to Snell's law. The reflected portions 151, 161, 171 travel back towards the surface of the earth 105 at the firs speed $V_1$. These reflected portions arrive at seismic receivers 140, 142 and 144 at times $t_1$, $t_2$, and $t_3$, respectively. Seismic receivers 140, 142 and 144 are typically geophones for land-based applications, but m ay be hydrophones for marine environments, or some hybrid of the two in some marine applications. The refracted portion 152, 162, 172 continue to travel deeper into the earth 100 at a second velocity $V_2$ dependant on the properties of lithology 120. Seismic waves depicted by ray paths 152, 162, and 172 may be reflected off yet a deeper rock formation (not shown) beneath lower lithology 120 and thereby provide data concerning even deeper layers of the geological formation.

The travel time for each seismic wave from source 130 to its respective seismic receiver 140 142, 144 may be determined by simple subtraction. That is, the travel time for the first seismic reflection, involving ray paths 150 and 151, is $t_1$-$t_0$. Consequently, the depthd and character of rock formation 110 may thus be calculated as is well-known in the art. More data may be gathered, and hence the accuracy of these calculations improved, when source 130 and receivers 140, 142, 144 are moved about. Similarly, additional seismic sources and seismic receivers provide more data.

Early efforts at exploration seismology cabled or wired all of the seismic receivers to a central recording or headquarter site and each seismic source was fired when ready. This approach did not present a problem to early exploration seismology systems because the limited number of source points and receivers were all located close to the headquarter site. In time, however, it was appreciated that greater resolution could be obtained by the use of more sources and more seismic receivers. Further, greater coverage area was desired, requiring yet more seismic receivers laid out yet further from the central site. As the number of receivers increased, it became less economical to connect all the seismic receivers by wire or cable to the central site.

The modern-day approach to alleviate this problem is to wire a limited number of geophones to a number of data acquisition units (DAU) as shown in FIG. 2. Headquarter site 200 is located remote from data acquisition units (DAU) 280, which includes a radio assembly 281 or a telemetry cable 282. DAU 280 connects by wire or cable 210 to a number of geophones 240–243 and may connect to other DAUs. A greater number of geophones is often connected to a particular DAU, with 24 or more geophones often connecting to each DAU in modern applications. Wire 210 may contain fiberoptic or metal conductors. The DAU's radio link 281 or cable link 282 may transmit geophone information to the HQ site 200 immediately upon its receipt at the DAU, or the DAU may store the relevant information in an associated memory for either immediate or later transmission. Radio link 281 or cable link 282 also is used to detect commands or instructions from HQ site 200 and to maintain DAU clock synchronization with the master clock at the project HQ.

DAU 280 has a variety of functions, including (1) receiving signals from analog sensors such as geophones and hydrophones, (2) providing signal conditioning such as filtering and amplification to the received signals, (3) high fidelity digitization of the signals, (4) responding to control commands received at radio 281 or by cable link 282, (5) performing self testing and providing quality assurance information to a central system, (6) providing accurately timed samplings of the signals, and (7) communicating to other system elements such as adjacent DAUs.

Referring now to FIG. 3, present day 3-D seismic data acquisition systems employ hundreds or even thousands of geophones and DAUs to cover an area that may exceed four square miles. Geophone lines 1–4 arc labeled 301, 302, 303 and 304, respectively, with each geophone line connecting numerous geophones to a series of DAUs. Referring back to FIG. 3, source lines A and B identify multiple source points. Also shown are eight mid-point lines, labeled 321–328. Upon completion, the system is physically moved, in a leap-frog manner generally along path 330, which thus results in a "swath" pattern and so this approach is known as the "swath technique."

Each DAU of such a system contains an internal clock to time the sampling of the seismic signal received at an attached geophone. One drawback arising in these systems is the requirement to synchronize the DAUs so that the recorded arrival times at each receiver are accurate and dependable. That is, because much of the data obtained from exploration seismology systems is dependent upon an accurate measure of the travel time of a seismic wave from a point source to a receiver, it is crucial that this travel time be measured accurately. However, in the event of time drift among the internal clocks of the DAU's, the data becomes unreliable.

A DAU's internal clock may be of any appropriate type, but is typically of the temperature compensated variety of crystal oscillator or a less accurate uncompensated clock. A temperature compensated crystal oscillator has a stability on the order of $1 \times 10$ to the minus $6^{th}$ accuracy ($1 \times 10^{-6}$), and thus is subject to a maximum drift of 0.6 milliseconds in 10 minutes. Consequently, left unattended, time drift can soon become an appreciable problem. Oven controlled crystal oscillator clocks typically have a stability of $5 \times 10$ to the minus $8^{th}$ power ($5 \times 10^{-8}$), meaning that th is subject to a maximum of 0.3 milliseconds of drift in 100 minutes. While the oven-controlled crystal oscillator clocks are subject to less time drift than their temperature-compensated counterparts, and time drift would still be unacceptable after approximately two hours. Moreover, the oven-controlled crystal oscillators are also more expensive and consume more power than temperature compensated crystal oscillators. Thus, a system that could eliminate time drift for both varieties, but especially less expensive, lower priced and less accurate clocks would be desirable. This would require a manner of synchronization without direct reliance on cable or radio to the DAU.

It is known to synchronize a DAU's internal clock by use of a global positioning system (GPS) satellite. However, this approach is not feasible where there is heavy forest canopy or some other sort of obstruction between the DAU's and the satellite. This is a significant drawback that interferes with the reliability of a production schedule. Further, using a GPS system to synchronize a DAU's internal clock requires additional components leading to additional cost. Moreover, this approach does not provide for communication between a headquarter site and each DAU.

Referring back to FIG. 2, it is also known to use radio 281 or cable link 282 to synchronize between the internal clocks of the DAU's and a master clock at a headquarter location 200. A communication link also is useful to allow direct and immediate communication from the central site to each DAU. However, a number of barriers or drawbacks exist that have prevented radio telemetry from working efficiently and providing a universal solution for seismic surveys and cable links also have a number of barriers or drawbacks that likewise have prevented them from working efficiently.

For example, radio telemetry may be unable to provide reliable communication in mountainous terrain or heavily forested areas. Radio may also be unsuitable in urban areas because of the significant radio interference from, for example, taxi routing systems and building obstructions. Radio may also be inappropriate near an oil refinery, where radio interference would prevent proper operation of the refinery. Further complications include radio licensing requirements and unavailability of sufficient radio band width. The capital cost and maintenance cost of radio systems and the operational down-time while radios are repaired are also major economic and logistical hurdles to overcome. Other drawbacks are also present to radio communication, such as the time required to transmit large volumes of seismic data from the DAU to the central system, which has seriously degraded operational efficiency. These and other problems with radio systems have created a desire for a novel seismic exploration system.

Cable links between DAUs also have appreciable drawbacks. Cable links have a high cost to operators to lay out and pick up. Further, they are prone to damage and are expensive to repair. Electrical leakage often occurs that may severely degrade a transmitted signal. The loss of production due to interruption of operations while cable problems are addressed is a major drawback to the use of cables. Problems with fiberoptic cables are of the same type, except that electrical leakage is not a factor. However, the cost to repair these fiberoptic cables may be even higher than their conventional counterparts.

Therefore, there has been an increasing effort to provide cableless systems that are less dependent on radio transmission. Prior efforts have attempted to record and store seismic data in the DAU itself without a radio link from the DAU to a central site, but with only a one-way radio link from the central site to the DAU. While this may reduce the drawbacks of radio communication, it is still dependent on radio transmission from the project HQ to the DAU. If this transmission is lost, the DAU is inoperative.

Other problems have also existed in the prior art systems, and thus an exploration seismology system is needed that solves or minimizes many of these problems. Ideally, such a system would have many advantages over prior art systems of any type and additionally could yield many of the benefits of a radio-based communication scheme without its drawbacks. Such a system could also be used in conjunction with radio-based systems or other prior art systems to provide seismic exploration in portions of the survey areas that were heretofore unreachable or inconvenient for various reasons. Ideally, this system could be used for applications more diverse than exploration seismology.

SUMMARY OF THE INVENTION

The invention features a seismic data acquisition system including the generation of a series of nearly identical seismic shots (SISS) from a fixed site that are received at novel data acquisition units placed in the field. The timing of these SISS shots can be used to compensate for the internal clock drift of a time clock placed in each novel data acquisition unit. The timing of these SISS shots can also be varied to communicate with and transmit data to the remote novel data acquisition units. Alternately, the SISS shots can be used both to synchronize and to communicate with the novel data acquisition units.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

Tables 1–11 are Menus of a menu structure suitable for use with SISS communication shots.

DETAILED DESCRIPTION OF THE PREFERRED EMBODIMENT

Figure 4:
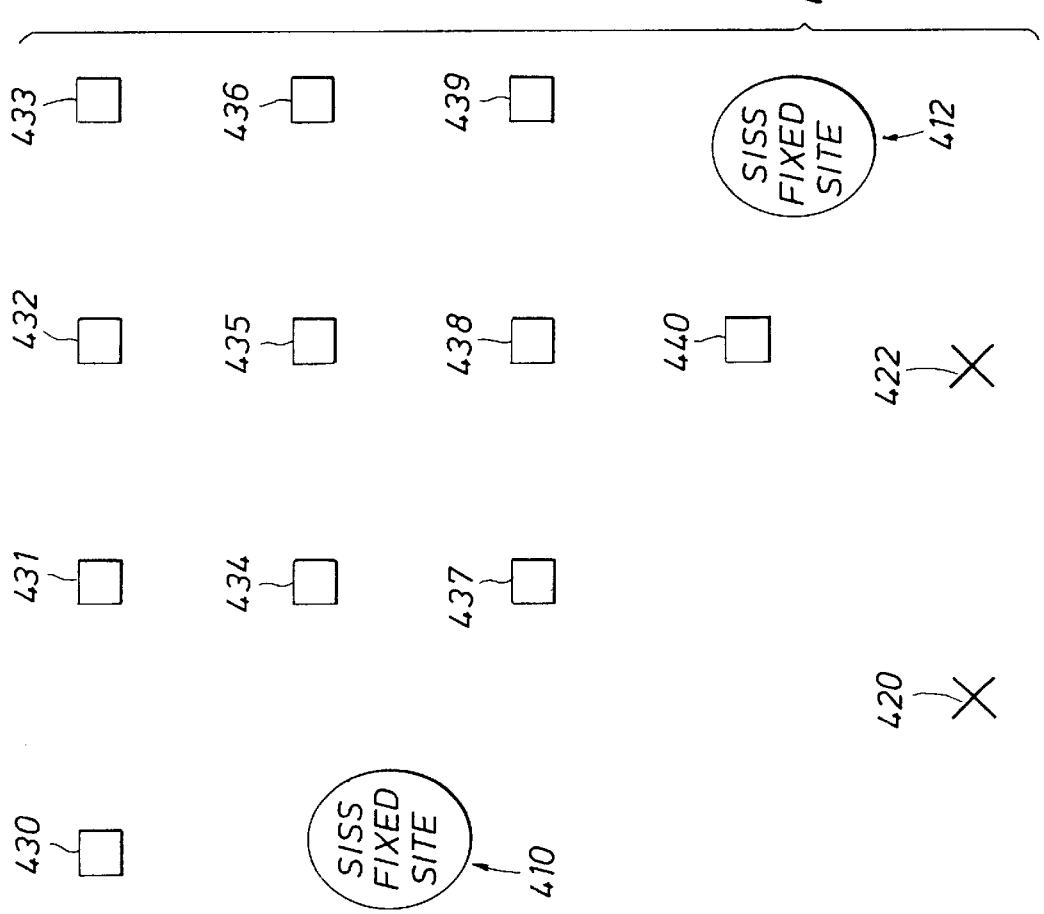
FIG. 4 is a diagram illustrating field deployment of novel data acquisition units.

A seismic data acquisition system built in accordance with the teachings of the present invention is shown in FIG. 4. Shown are fixed sites 410 and 412 each appropriate for generation of a series of nearly identical seismic shots (SISS), production shot locations 420 and 422 and data acquisition units (DAU) 430–440. Each DAU connects to seismic receivers such as geophones (not shown). Production shot locations 420 and 422 are used as is known in the prior art, i.e. for data gathering purposes and to determine the character of the underground rock formation. If convenient, a source location used for production shots may be the same as that used for the SISS shots, although this is not necessary. As explained below, the present invention uses the SISS to synchronize and/or communicate with the various DAU's 430–440. Proper timing of seismic shots from fixed sites 410 and 412 combine with proper programming of DAU's 430–440 to result in a robust and flexible seismic exploration system utilizing seismic communication without the drawbacks of radio or cable communication. Alternately, the teachings herein may be used in conjunction with another communication method, such as radio link, to increase speed and reliability, or to reach areas that are not accessible due to interference or other problems. More broadly, the teachings herein may be used to control parameters of any type for a remotely controlled process. Further, while a surface location for both the source and receivers is appropriate for the embodiment shown in FIG. 4, it can be appreciated that any portion of the present invention such as a source, receiver or DAU may be placed at a sub-surface location such as a borehole or a mine.

Figure 1A:
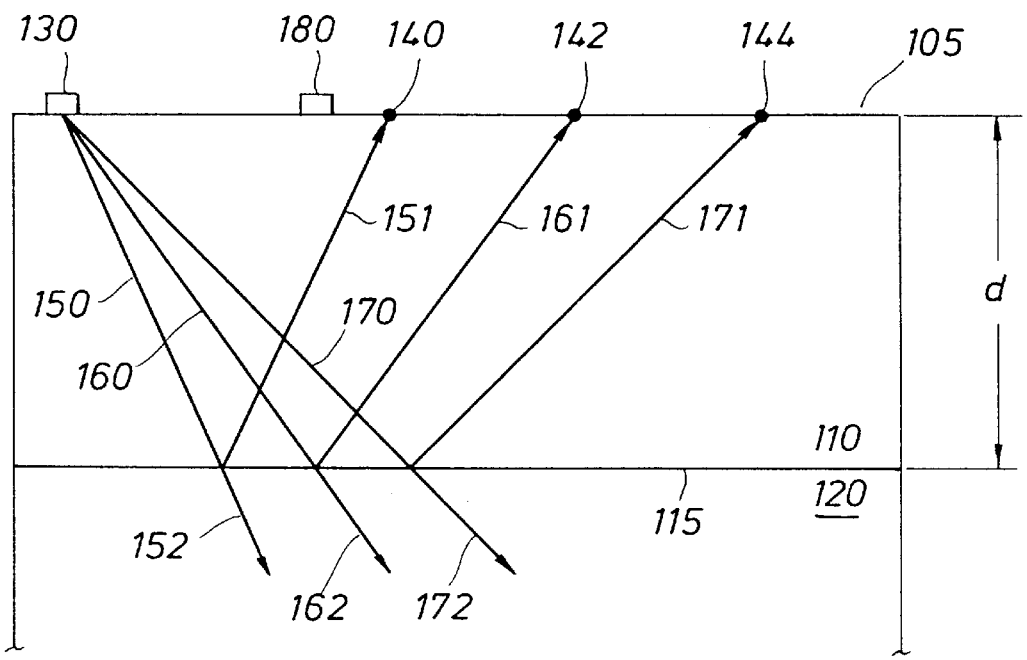
FIG. 1 is a cut-away view of a rock formation.
Figure 1B:
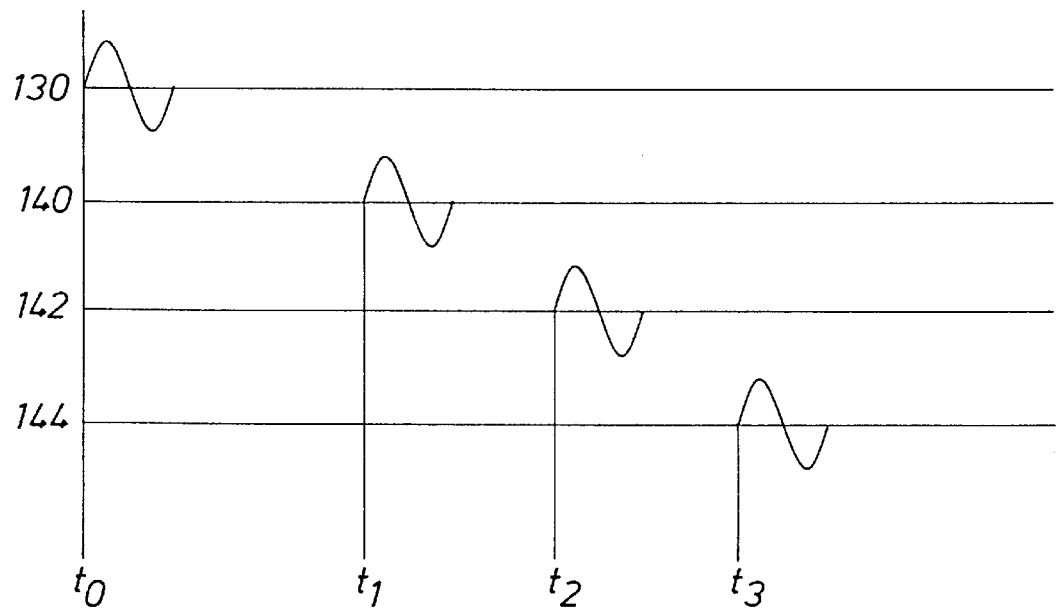
Figure 3:
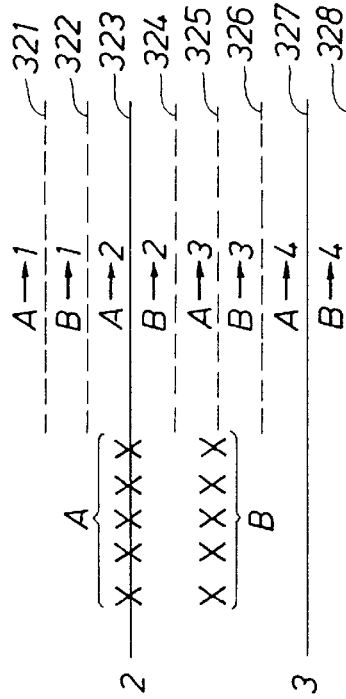
FIG. 3 is an illustration of the 3-D "swath" technique for seismic exploration.
Figure 2:
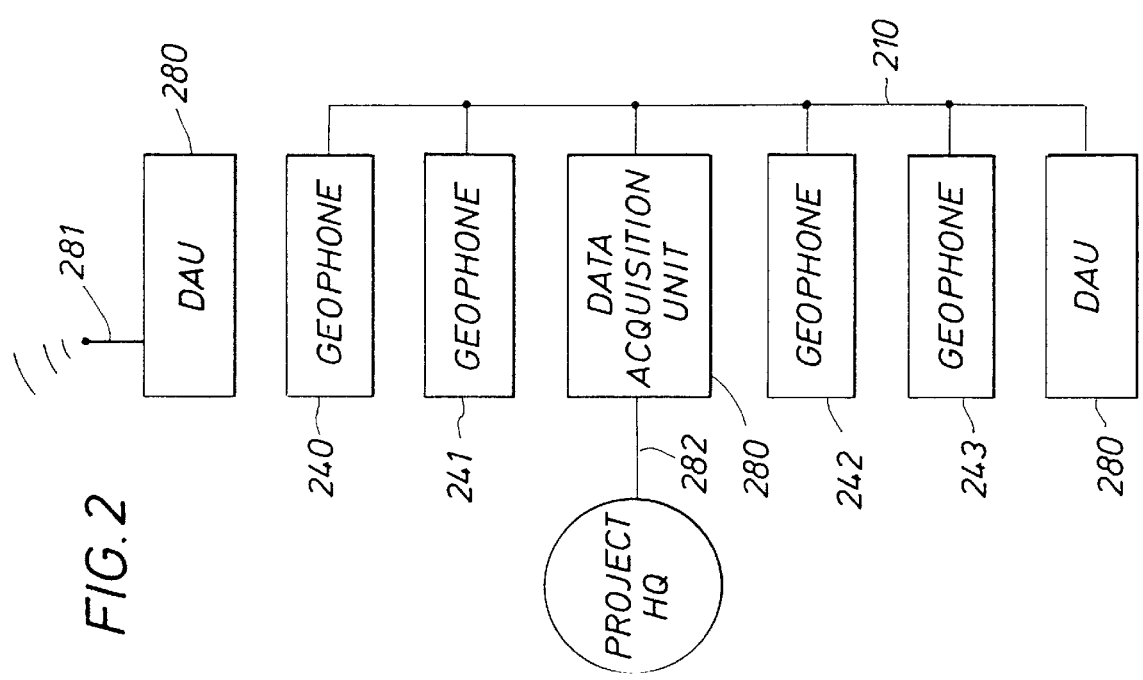
FIG. 2 is a data acquisition unit and attached seismic receivers.
Figure 5:
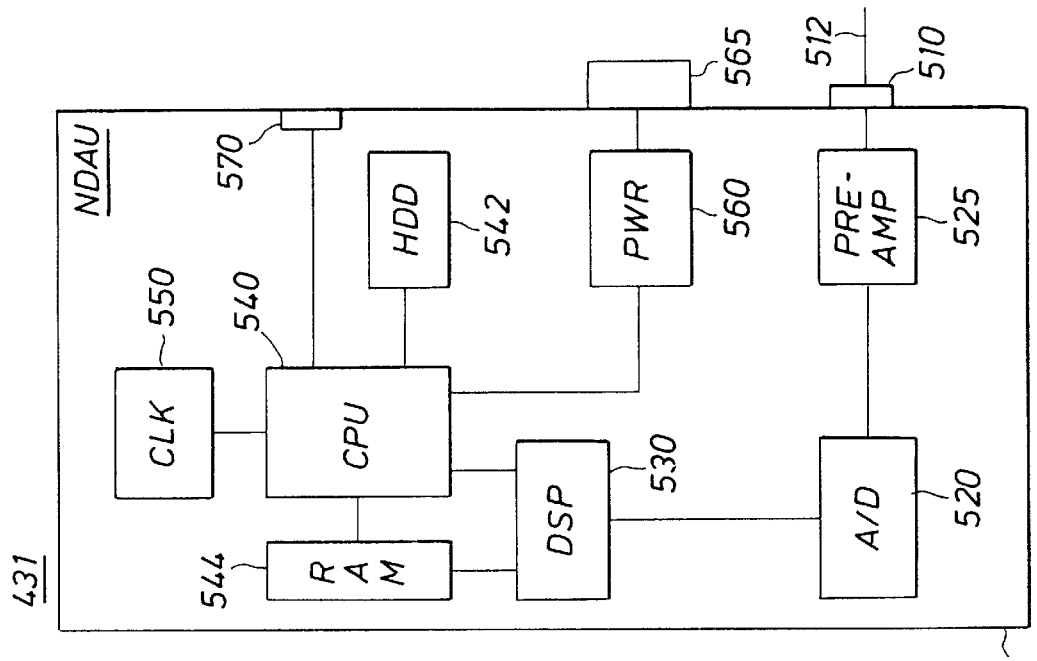
FIG. 5 is a novel data acquisition unit.

FIG. 5 illustrates a novel data acquisition unit 431 built in accordance with the teachings of the present invention. Novel data acquisition unit (NDAU) includes water-proof housing 500, data port 510 attached to sensors such as geophones (not shown) via line 512, signal conditioner and preamplifier unit 525, analog to digital converter 520, digital signal processor 530, and CPU 540. Also attached to CPU 540 (and other system elements) is power control center and internal battery 560, which is further connected to a supplemental external power supply 565, and NDAU input/output data port 570. As will be appreciated, power control center and internal battery 560 also connects to other elements as needed. A quartz oscillator clock 550, hard-disk drive (HDD) 542, and memory 544 connect to CPU 540 as well. The NDAU's power control center and internal battery 560 regulates power supplied to CPU 540 (and other system elements). External power supply 565 may augment or replace the NDAU's internal battery. External power may be supplied by, for example, a solar cell, a micro-hydrogenerator, a fuel cell, a wind-powered device, a thermal device, or other appropriate power generator. To conserve energy, the NDAU preferably has low power consumption while in full operation and a power conservation capability including a "sleep" mode. Clock 550 may be either of the oven-controlled or temperature-compensated variety of crystal oscillator, but the teachings herein allow a less accurate variety to be employed, if so desired.

Hard disk drive 542 should have sufficient memory to store data from many days of geophone recordings. The exact memory size of an NDAU's HDD, however, depends upon the production schedule. For example, if a 500 megabyte hard disc is used for bulk storage in the NDAU, under usual conditions more than 30,000 traces could be stored at 32 bit sampling. If the NDAU has six channels, this represents 5,000 shots, over twelve days recording with shots at 2 minute intervals for 12 hours per day. A practical NDAU with significantly less storage capacity could be designed because of the no-shot detection capability and application of seismic data compression methods. In other words, a first approach to minimizing the amount of memory necessary in each HDD 542 is digital data compression by digital signal processor 530. A second approach to minimizing the memory necessary in an NDAU is by eliminating "dead time" from the record periods. Nonetheless, if an HDD has insufficient memory, loss of data due to insufficient memory may be avoided by operator visits to upload the pertinent information.

The HDD may be eliminated by substituting additional RAM memory. The DSP may be eliminated if its function can be performed by the CPU.

Referring back to FIG. 4, an exploration seismology team places multiple NDAU's 430–440 individually at various predetermined locations. The time of placement is a convenient time to reset or synchronize the internal clock of each NDAU. Because each NDAU is in the field, and thus physical connection with a master clock at headquarters is not possible, a highly accurate field clock contained in a data transfer unit (DTU) is employed. While the DTU is connected to the NDAU, it is also a convenient time to program each NDAU with other instructions.

Figure 6:
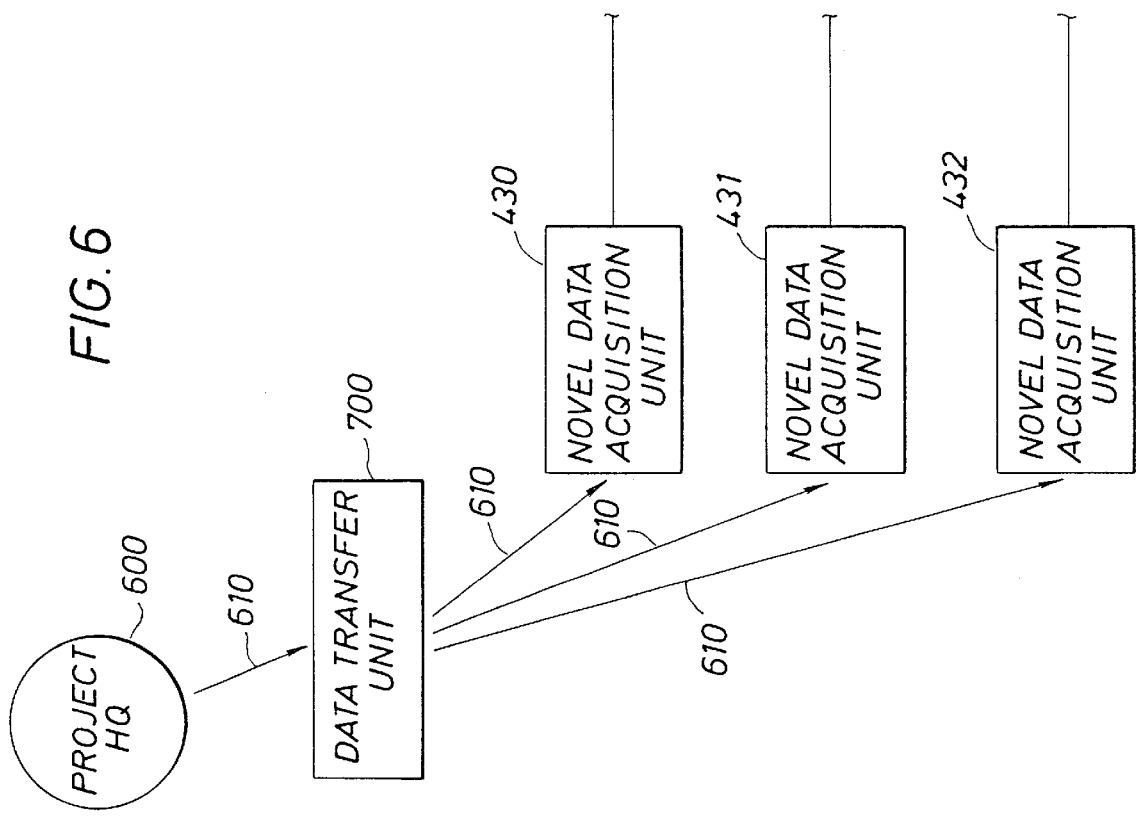
FIG. 6 is an illustration showing the concept of a data transfer unit.

The concept of a data transfer unit is illustrated in FIG. 6. Information and instructions such as the master clock time and production schedule are generated at project headquarters 600. Prior to each novel data acquisition unit being placed in the field by a deployment team, instructions or commands 610 are provided to data transfer unit 700. When the NDAUs 430–432 are placed in the field, data transfer unit 700 programs or "primes" each with instructions or commands 610 by physical or indirect connection. This priming step includes synchronizing the NDAU clock with the DTU clock, diagnostic quality assurance of the NDAU's functions, and loading the station ID and location coordinates. As explained below, the DTU may also establish a specific menu structure, or Menus, in each NDAU at this time. These Menus, in combination with the SISS, may be used to reconfigure or reprogram the NDAUs during a particular exploration operation. At the end of a production cycle, each NDAU is collected from the field. This is a convenient time for a DTU to connect to each NDAU and perform diagnostics, as well as upload information from the NDAU. The uploaded information is then delivered to project headquarters (HQ) 600. At the HQ site, predictable or discernable errors made by the NDAUs in their shot comparisons can be detected and accounted for by processing.

Figure 7:
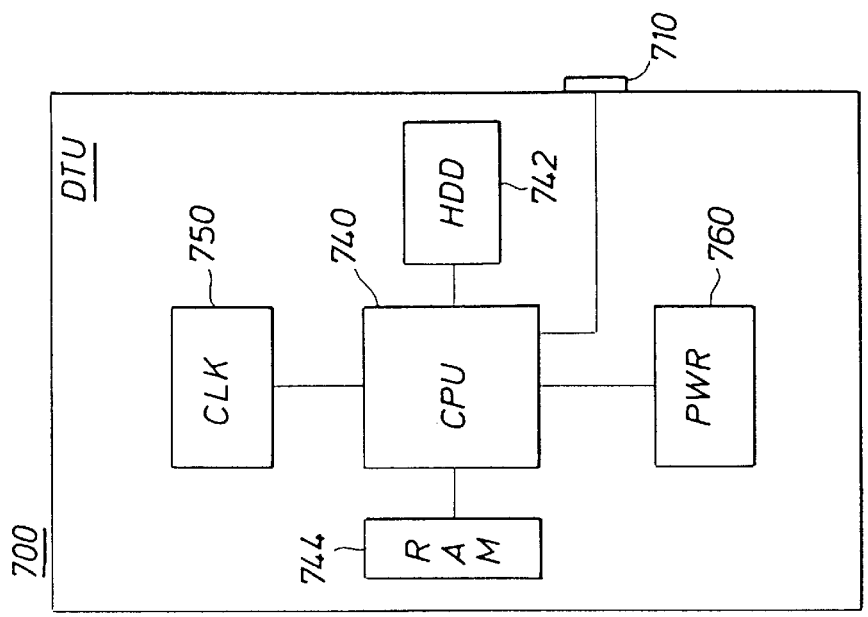
FIG. 7 is a portable data transfer unit.

Referring now to FIG. 7, a portable DTU 700 contains a CPU 740, highly accurate clock 750, memory 744, a hard disk drive (HDD) 742 and a power control/battery 760. Power control/battery 760 connects to other elements of the DTU 700 as necessary. Also shown is data input/output port 710 connected to CPU 740. Typical storage requirements for the hard disk drive 742 is 10 gigabytes of data. Further, power control center and internal battery 760 should be capable of at least one day of operation before recharging or replacement is necessary. For data port 710, a rapid means of transfer of data to and from an NDAU is preferred in order to minimize operational time for any data transfer, such as from the project headquarters or to a particular NDAU. As such, data port 710 may be any electronic means so long as it is efficient and reliable under all conditions. Wire link, fiber-optic link, infra-red link, short range radio link, or transfer of physical media such as tape or disk are all appropriate. Correspondingly, data port 570 of the NDAU shown in FIG. 5 may have the same data transfer means.

Referring back to FIG. 4, upon positioning a first NDAU 430 and its associated geophones in the field, a series of nearly identical seismic shots (SISS) is preferably begun from fixed site 410. As such, virtually no time drift of the NDAU's internal clock 550 occurs before it receives a calibration shot from fixed site 410. The calibration shot is defined as the first SISS shot received at a particular NDAU. The calibration shot and subsequent SISS shots occur at predetermined and preprogrammed intervals. As such, given sufficient signal-to-noise ratio, the calibration shot and later shots may be cross-correlated and the delay intervals measured. A mathematical comparison process other than cross-correlation, such as inversion, might alternately be used to obtain the same result as cross-correlation. If the measured interval at the NDAU differs from the predetermined interval, the CPU of the NDAU resynchronizes its internal clock to account for this detected time drift. This sequence occurs at each NDAU positioned in the field. To minimize time drift even further, it is desirable to take the calibration shot while the DTU 700 is still connected to the NDAU. To ensure adequate signal-to-noise (S/N) ratio for the signals received at the NDAU, a second SISS shot may be taken and the first cross-correlation may then be computed and signal-to-noise adequacy determined prior to disconnection of the DTU from the NDAU. If S/N ratio is below a predetermined level, steps may be taken to alter the source, receiver, or processing configuration, and a new test taken.

For continued quality assurance, at least one NDAU can be hardwired or otherwise configured for two-way communication (e.g. radio) with a HQ site. The fixed-site source performance may be recorded and monitored to allow calculation and application of corrections to time drift computed by the NDAUs. These final corrections could be applied after the NDAU data has been compiled at the HQ site. Alternatively, they could be communicated to the NDAUs by means of a subsequent SISS communication and applied by the NDAUs.

Figure 8:
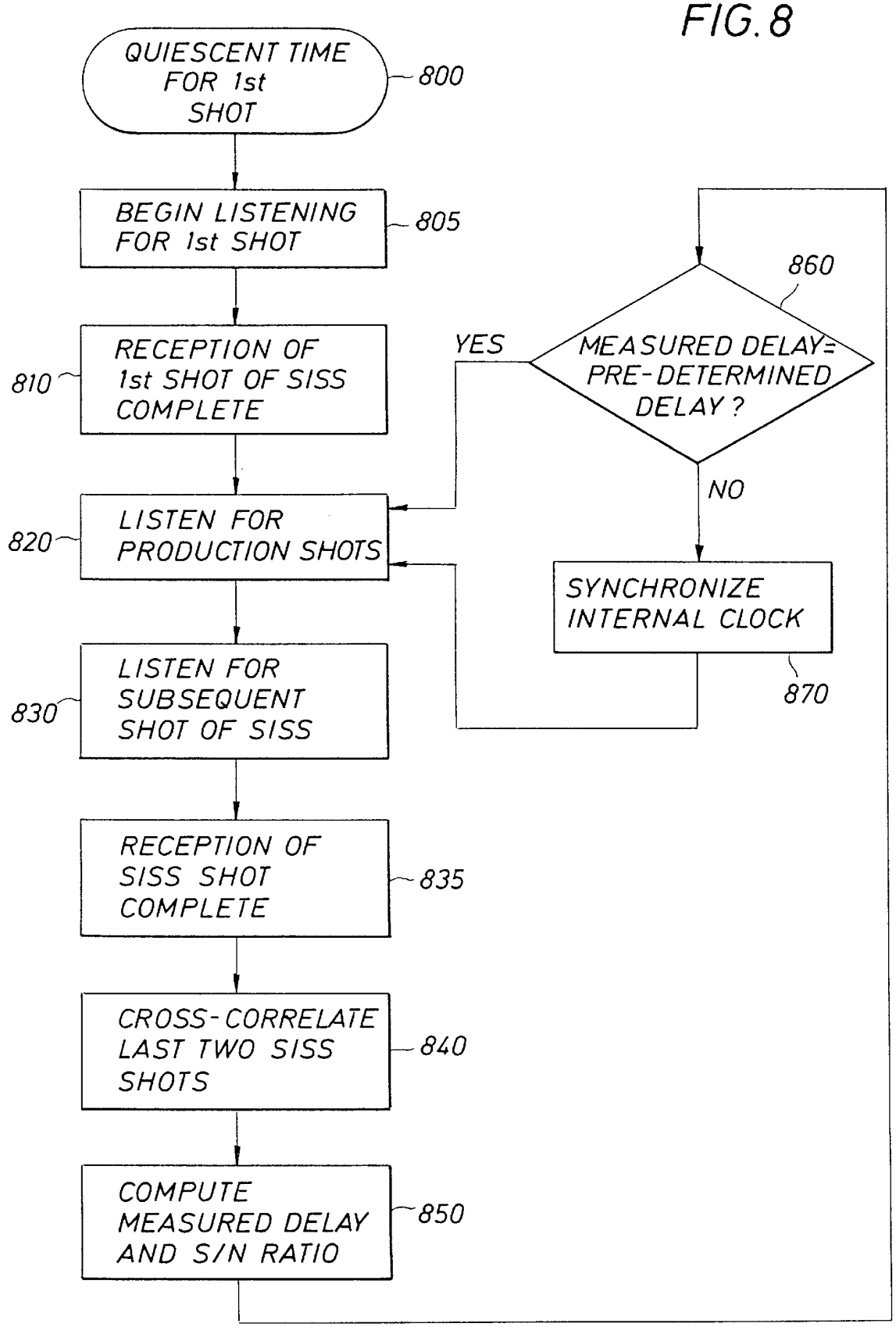
FIG. 8 is a flowchart of an NDAU's listening for seismic shots.

FIG. 8 is a flow chart showing the drift correction sequence for an NDAU central processing unit (CPU). Referring now to FIG. 8, at step 800, a quiescent period occurs during which no production or SISS shot occurs. Spacing of the seismic shots helps reduce interference and improves the signal-to-noise ratio. At step 805, the NDAU's CPU listens for a first shot of an SISS. This shot may be a calibration shot. The CPU completes reception of this shot at step 810. At step 820, the CPU listens for one or more production shots. Steps 805 and 810, and step 820, occur according to a pre-programmed production schedule and thus either is not necessarily present during any particular cycle. At step 830, the CPU listens for a subsequent SISS shot. The NDAU completes reception of the subsequent or next shot of the SISS at step 835. The most recent two shots are cross-correlated or otherwise compared by the CPU at step 840 and the measured delay between an earlier SISS shot and a subsequent SISS shot is computed at step 850. Alternatively, the CPU may use a reference which is a combination of previous SISS shots. Signal-to-noise ratio may also be determined at step 850. At step 860, the CPU determines if the measured delay of step 850 is equal to the pre-determined interval. If the measured and pre-determined delay match, then there has been no time drift by the NDAU's internal clock and the CPU once again returns to step 820 and listens for production shots. If, on the other hand, the measured delay is not equal to the programmed delay, the CPU resynchronizes its internal clock at step 870 and then proceeds to listen for production shots at step 820. This cycle continues, comparing pairs of SISS shots, until the end of the production schedule or until the NDAU is interrupted by some outside source.

Figure 9:
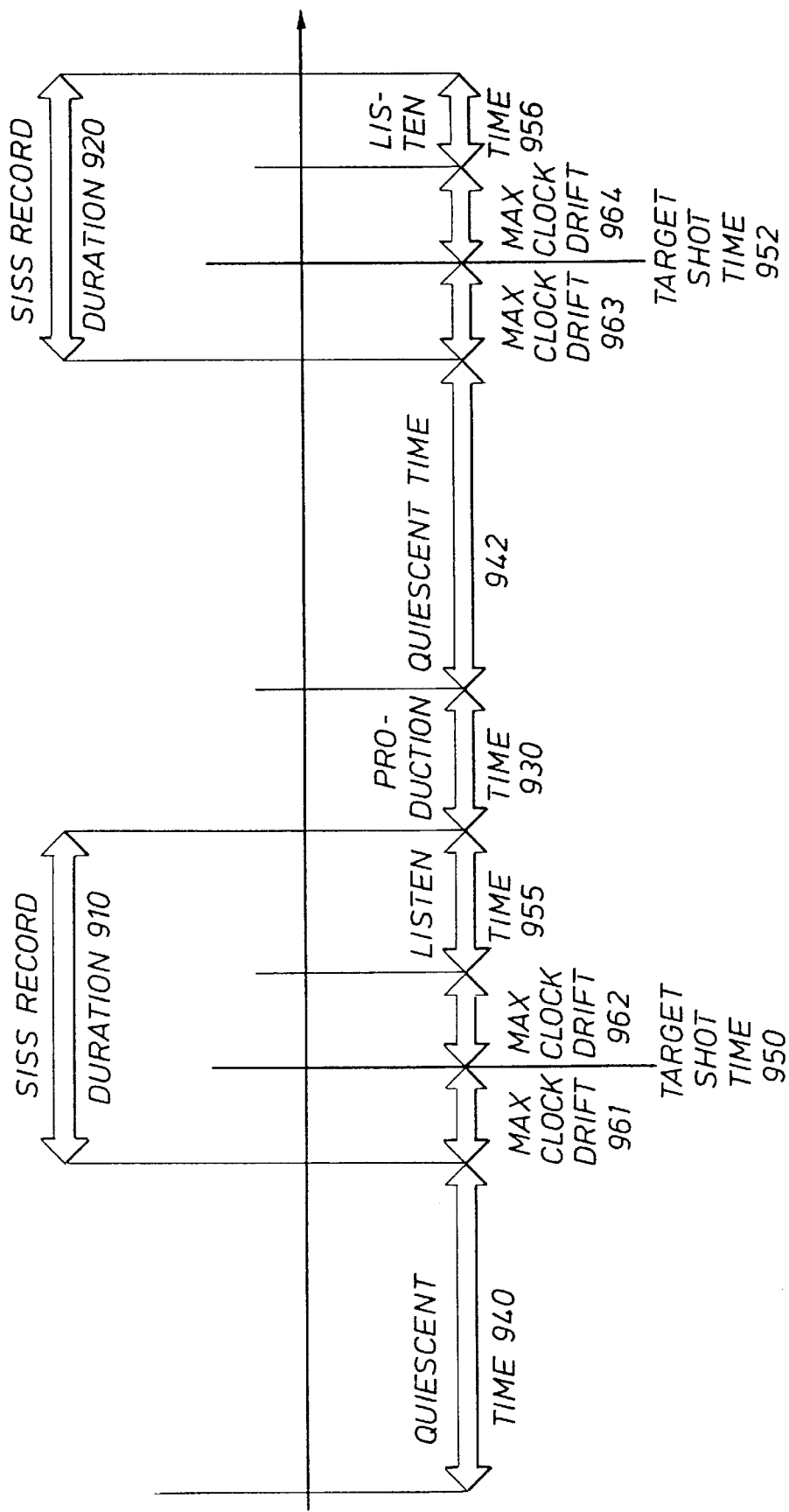
FIG. 9 is a time line for the case where an SISS is used for synchronization only.

FIG. 9 (not drawn to scale) illustrates a time line that corresponds to an SISS used only for synchronization of NDAU clocks. Shown are SISS record durations 910 and 920 sandwiched around a production time 930. SISS Record Duration 910 follows a quiescent time 940 and includes a target shot time 950 surrounded by maximum clock drift periods 961 and 962, and a listen time 955. SISS Record Duration 920 follows a quiescent time 942 and includes a target shot time 952 and maximum clock drift periods 963 and 964. SISS Record Duration 920 also includes a second listen time 956.

The SISS record durations 910, 920 and their preceding quiescent times are periods of time dedicated by the present embodiment to the calibration and synchronization shots. The exact start and end times of each SISS record duration are defined by Programmed Time Windows start and end times stored in each NDAU. Periods dedicated by each NDAU to seismic synchronization shots are interspersed according to a pre-programmed schedule with periods during which production shots are fired. Each production shot period 930 may contain more than one production shot. Further, SISS Record Duration 920 may be followed by additional production periods and SISS Record durations.

Focusing on SISS record duration 910, target shot time 950 represents the predicted or pre-programmed time for receipt of a seismic shot from a fixed site. However, each NDAU must also account for possible time drift of its internal clock and thus must actively record data prior to the target shot time 950 for a seismic shot. The length of this period of time 961 equals or exceeds the maximum clock drift. Typically, 100 msec is a sufficiently long period to account for clock drift and small source timing inaccuracies. Each NDAU must also account for potential time drift of its internal clock in the opposite direction and must record data for an additional maximum clock drift period 962. An NDAU preferably records data through a period of time which is the sum of listen time 955, to ensure receipt of the SISS shot wave train, and the maximum clock drift in both directions. Listen time 955 may be as short as about 1 second or as long as necessary, with periods of up to about 30 seconds being possible if a Vibroseis source is chosen for the SISS wave trains. Nonetheless, the exact listen time necessary will change on a case-by-case basis.

As stated above, the first shot of an SISS received by an NDAU is defined as a calibration shot. The wave train from such a shot might arrive during SISS record duration 910. The wave train from a second shot arrives a scheduled time later, such as during SISS record duration 920, and is used as a synchronization shot. These shots received during SISS record duration 910 and SISS record duration 920 may then be cross-correlated or otherwise compared to determine, and correct for, NDAU clock drift. The time drift existing at the time of any particular production shot may then be interpolated from the known time drift data.

For example, time drift of an NDAU's internal clock that occurs between a calibration shot and a following synchronization shot may be computed as the difference between the measured interval between these shots and the pre-programmed interval between these same two shots (i.e. measured interval−programmed interval=clock time drift). Subsequent synchronization shots may likewise be paired and analyzed to compute NDAU clock drift. Additional synchronization shots occurring in subsequent SISS record durations combined with enhanced signal processing can also be used to improve the accuracy of each cross-correlation and peak picking. In addition, because seismic source units may not always fire exactly at the proper time, additional shots of the SISS subsequent to the calibration shot may be analyzed to account for time deviations corresponding to mis-timed source shots. The fixed-site source may also be monitored and its performance recorded and this information used in later calculations of NDAU clock drift adjustments.

Each quiescent time 940 and 942 should be of sufficient length to allow previous seismic shots to not interfere with the receipt of subsequent shots. A quiescent time of about four seconds is envisioned as sufficient to attenuate seismic disturbances. While the invention may be operable with a shorter quiescent time, such a shorter time would degrade the signal-to-noise ratio for the synchronization shot received at each NDAU and thus extending the quiescent time 940, 942 is a way to improve signal-to-noise ratio for a received signal when interference is present from previous seismic shots.

Figure 10:
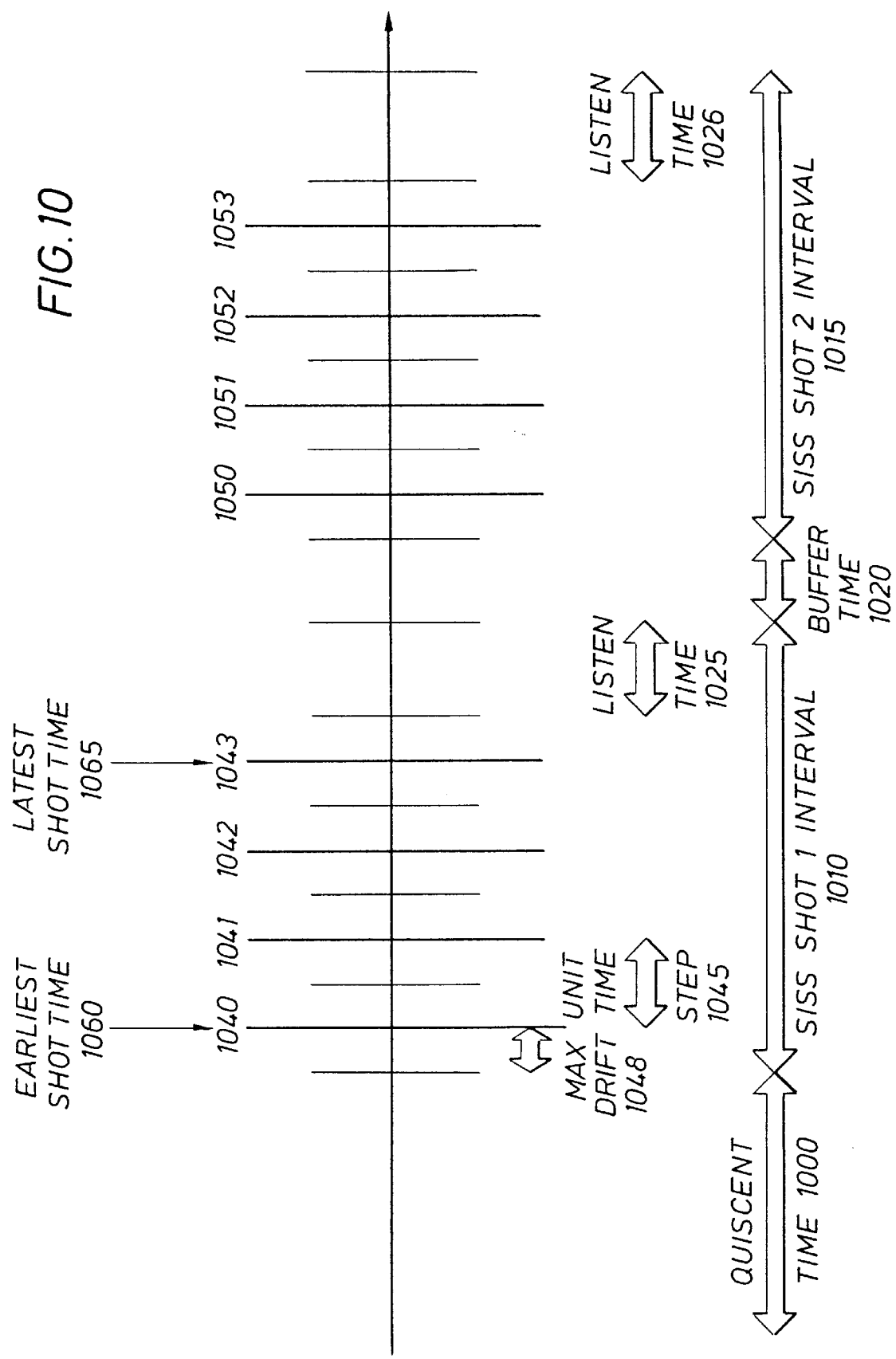
FIG. 10 is a time line for the case where an SISS is used for communication.

The SISS may also be used to communicate with each NDAU. When the SISS is utilized as a method to communicate with the NDAUs, the predetermined interval between communication SISS shots may vary. Referring now to FIG. 10, a time line including a quiescent time 1000 SISS shot 1 interval 1010, a buffer time 1020, and SISS shot 2 interval 1015 are shown. SISS shot 2 interval is often followed by an additional buffer time and SISS shot interval (not shown).

SISS shot 1 interval is divided into an Ordinal Count (e.g. 4 in FIG. 10) number of target shot times 1040–1043. The Ordinal Count is the number of values each SISS shot interval may attain (the number of target times each shot has). Each target shot time is spaced from its neighbor by a period called the Unit time step 1045. Thus, the duration of each SISS shot interval includes the Ordinal Count multiplied by the Unit time step plus the listen time. The Unit time step must be at least two times, and preferably is four times, the magnitude of the maximum clock drift 1048. A longer Unit time step 1045 helps an NDAU to determine without ambiguity the nearest target time among 1040–1043, and hence the value corresponding to an SISS shot. The first target time of an SISS shot interval is defined as the Earliest Shot Time 1060, while the last is called the Latest Shot time 1065. SISS shot 1 interval also includes listen time 1025, whose purpose is the same as listen time 955, discussed in regard to FIG. 9.

Quiescent time 1000 is a quiet period during which no seismic shots (SISS or production) are fired and previous shots and reflections attenuate. A timed seismic shot is then received from an SISS shot source during a pre-programmed SISS shot 1 interval. This seismic shot may have been taken at, for example, four different target times 1040–1043, corresponding to ordinal integers 0 to 3, and communicates different instructions to the NDAUs depending upon which target time is closest to the shot time. As such, this shot is referred to as a communication shot because it communicates information. Because of clock drift, a received seismic shot is unlikely to be determined to have been taken (according to the NDAU's clock) at exactly one of the target times 1040–1043. Thus the NDAU's CPU selects the nearest shot target time to the actual seismic shot time.

After an appropriate buffer time 1020, an additional communication shot wave train arrives to each NDAU during the SISS shot 2 interval 1015. For optimum performance, the buffer time 1020 should be long enough to minimize interference in the signal trains from successive SISS shots. For example, four seconds might be an adequate buffer time. However, a long buffer time may be prohibitive where a great amount of information (and hence many SISS communication shots) must be relayed to the NDAUs. Under those conditions, a shortened buffer time may be used. This buffer time 1020 would then ordinarily be shorter than the quiescent time 1000. Nonetheless, the minimum length of buffer time 1020 will vary on a project by project basis and may be determined by field survey. Subsequent SISS shot intervals (not shown) are envisioned as occurring after SISS shot 2 interval, often with no interruption by production shots.

Preferably, the last SISS shot interval (and therefore the last shot of each SISS) should be dedicated to a parity shot. This parity shot is used for redundancy and error checking. The parity shot may be the average value of a preceding number of SISS shots, rounded to the nearest integer. For example, where five SISS shots are in a series, three SISS shots communicate information (the first SISS shot being a calibration shot). Their ordinal values may equal 1, 30, and 16, respectively. Thus, the parity shot would then be timed to arrive on the target time corresponding to its ordinal value 16, the nearest integer to the average value of 15.67. Alternately, the parity shot could equal the total of the preceding communication shots. In the above example, the parity shot would then have an ordinal value of 47. This normally would require the SISS parity shot interval to have an ordinal count equal to the total number of previous communication shot target times.

Variations of the described communication scheme could also be employed. For example, each SISS shot interval could have an Ordinal Count of two, with each SISS shot interval representing a 0 or a 1. The data contained in consecutive SISS shot intervals could then be strung together to provide a binary number. Another binary scheme could be employed to switch from a synchronization only protocol to a more complex communication protocol. For example, projects could be planned and scheduled such that only in exceptional circumstances would any more than two shots be taken in any SISS. By using two shots per SISS there would be retained the capability to signal that a subsequent SISS would be according to a more complex Menu, thus allowing deviation from an original schedule.

In addition to transmitting data, a communication shot may be employed to synchronize a NDAU's internal clock. The NDAU's CPU computes the time drift of its internal clock by measuring the time difference between actual receipt of a signal and its closest target time. For example, if the unit time step 1045 is set to 20 msec, then errors of less than 10 msec introduced by time drift may be corrected for because it is known that SISS shots can occur only at integer multiple of the SISS unit time step. SISS shots used both to synchronize the clocks of the NDAUs and to communicate information are called S/C shots.

Figure 11:
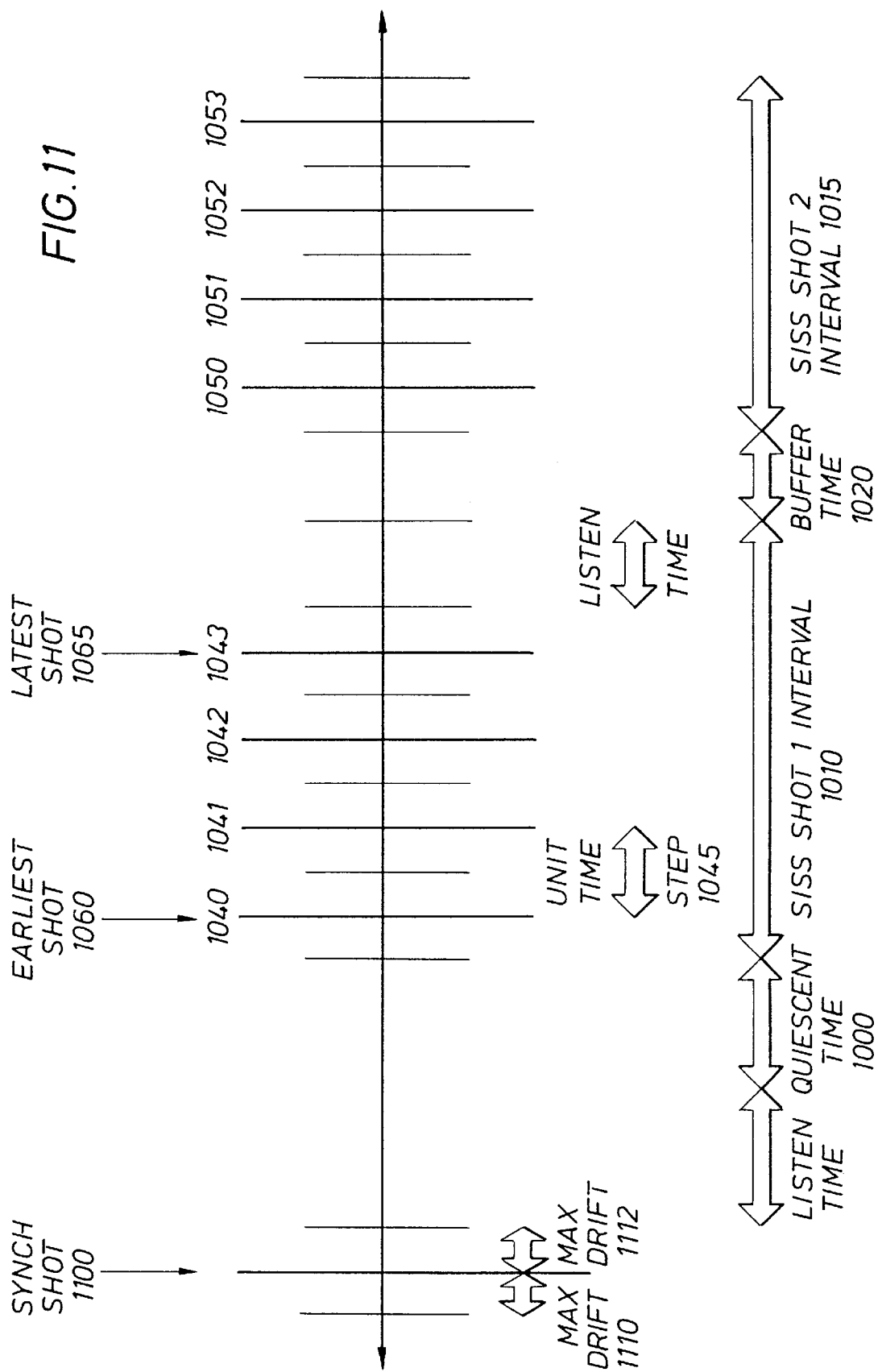
FIG. 11 is a time line for a communication SISS including an SISS synchronization shot.

Another embodiment of the invention employs an initial synchronization shot before each sequence of SISS shot intervals. Referring now to the time line of FIG. 11, a synchronization shot target time 1100 followed by SISS shot intervals 1010 and 1015 are shown (SISS shot interval 1015 also includes a listen time, not shown). Also shown are quiescent time 1000 provided before the SISS shot intervals to allow the synchronization shot to attenuate sufficiently, and a maximum drift time 1110. Maximum drift time 1110 is shown prior to target time 1100 of the synch shot and is accompanied by another drift period 1112 after target shot time 1100. The synchronization shot corresponding to target time 1100 is used solely to synchronize the clocks of the NDAUs. Subsequent shots of this SISS are then used to communicate information. Alternately, these subsequent shots may be S/C shots.

Inclusion of the synchronization shot corresponding to target time 1100 accommodates a shorter buffer time between SISS shot intervals because the provision of a "clean" synchronization shot waveform helps with a first cross-correlation and helps compensate for a lower signal-to-noise ratio with subsequent communication or S/C shots. Such a synchronization shot also corrects for certain errors possible with the communication shots. For example, because of greater than envisioned clock drift a communication shot may fall closest to an incorrect shot target time 1040–1043. This could result in a misconstrual of the transmitted value corresponding to an SISS shot. However, the synchronization shot of this embodiment independently indicates the magnitude of any NDAU clock drift. Consequently, the CPU of an NDAU can properly interpret the transmitted command. Such freedom allows an operator to shorten the programmed Unit time step.

Another embodiment of the present invention employs the "paired-shot" method. In this method, each production shot corresponds to, or is "paired" with, an SISS shot, although each SISS shot need not necessarily be paired with a production shot. This method allows synchronization to occur as often as necessary and virtually eliminates clock drift interpolation for a SISS shot's associated production shot. Further, this approach includes synchronization shots on the same file as production shots, which assists in error correction and enhances an operator's confidence in the system.

Figure 12:
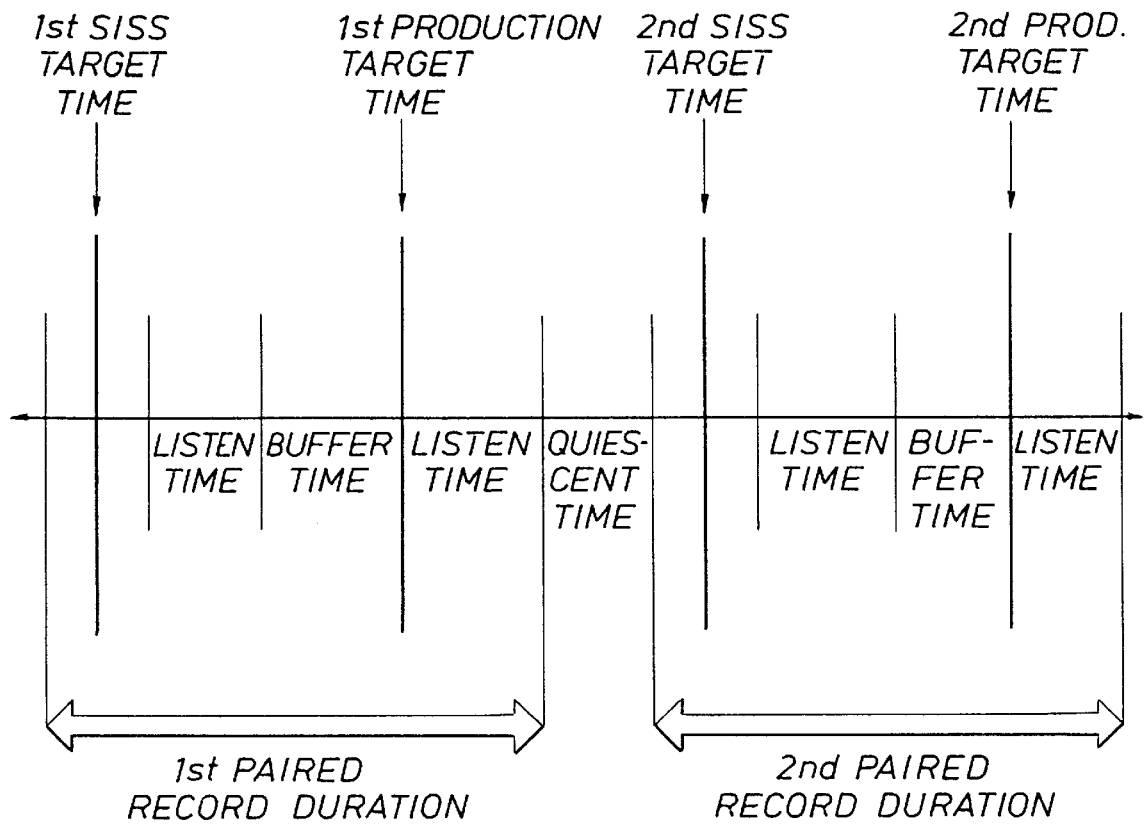
FIG. 12 is a time line for one example of the "paired shot" method.

Referring to FIG. 12, a first SISS target time precedes a first production shot target time by a first listen time and a first buffer time plus maximum drift. Similarly, a second SISS target time precedes a second production shot target time. One confirmation recording is taken that includes the wave trains from the SISS and the production shots. Listen times and quiescent times are inserted between each production shot and the subsequent SISS target time. As can be appreciated, either an SISS shot or a production shot may occur first in any particular pair of shots. However, because the first shot can interfere with a second shot, the synchronization shot should normally be the first shot of the pair. Quiescent times should generally be longer than buffer times. In some cases, no production shot will occur even though one was expected. For those cases, the recording should still be taken at full length and in NDAU processing the absence of the production shot will be detected by manifestations such as energy levels or missing first breaks. The production shot portion of the recording may be discarded by the NDAU to conserve memory. Optionally, if the SISS shot is used as an S/C shot, the S/C shot may confirm that no production shot accompanies it, unless other communication requirements preclude this.

Where an SISS shot is used to communicate information other than synchronization data, the values corresponding to each communication or S/C SISS shot are translated into commands and information according to a set of Menus programmed in each NDAU by the DTU. Each menu comprises a table of delay values versus message information enabling the NDAU's CPU to translate the delays into the intended information. For a particular model of NDAU, a general menu is established which defines the most general case for the capabilities of that NDAU. Each general menu is composed of many variables, including a unique identifier. Standard defaults may be provided for certain other variables. If there is not a general default for a variable, it may be determined solely by the SISS, and thus the general menu can be used directly (as can any menu). For a given project, a single project menu is defined which includes all of the parameters of the applicable general menu and adds all of the project-specific parameters that apply. The project menu also establishes any variable that will not vary throughout the project or production schedule by means of setting default values. The project menu further defines project ranges and valid values for other variables. The project menu may further be divided into a number of subsets called "set menus." Each set menu further defines other variables, and thus reduces the number of parameters that can be changed. Examples of parameters are recording schedule, including the PTW start and end times, the Unit step time, and the earliest and latest shot times. Other parameters in a menu include constant gain setting, sample period, record length, record interval. and filter settings. Yet another parameter could be an indication of previous source drift. An SISS may also convey the identification of the next applicable Set Menu and PTW start and end times.

Some parameters are not explicitly stored in the Menus, but rather are algorithmically computed from the shot interval times and/or number of shots in the SISS. Conceivably, hundreds of set menus could be required for a particular project. However, normally the number would be fewer than 20. The benefit of defining the lower level Menus is to limit the number of shots in the SISS, to reduce the amount of time and effort to complete the SISS, and to minimize the chances of error during communication.

The SISS can be used to enable a more specific menu, such as a set menu, and thereby set additional default values. The SISS can also be used to enable a more general menu. Tables 1–11 are examples of a General Menu, a Project Menu, and Set Menus and are located in Appendix A. In addition, the SISS can instruct a portion only of the NDAUs to sleep or ignore subsequent commands, or to change menus, for example.

The decision of what device to use as the SISS signal source is based upon many of the same considerations as present in the prior art. In addition, the SISS signal source requires multiple shots from the same location, with the interval between firings preferably being 10 seconds or less. It will generally be acceptable for the source to be fired within one millisecond of the targeted time. This means that chemical explosives are generally inappropriate as an SISS source because they are unable to quickly reload (in addition to the fact that explosives generally alter the earth proximate to the charge and thus would introduce significant variation among the SISS wave forms). More appropriate sources include airguns and other impulsive sources. Vibroseis is also appropriate, and also allows multiple source units to be used either with or without overlapping sweeps. If a Vibroseis SISS source is chosen, the duration of the SISS will be lengthened and thus the computing demands on the NDAU are increased. If a longer interval is acceptable between shots, a slower reloading signal source may be used. This requires the interval between shots to be increased.

For marine applications, certain other considerations are relevant. For airguns sources, care must be taken that bubbles from previous detonations have time to disperse to the surface before the next detonation. In areas with significant shallow water, an anchored or spudded barge may be used to deploy the airguns.

The source units may be triggered as is known in the prior art. Alternately, each source unit may utilize an extremely accurate clock, such as GPS or OCXO-based clock, so that it activates on the required schedule and does not rely on radio or wire link to the project HQ. If OXCO-based clocks are chosen, they must be synchronized with the master clock at least once or twice daily. This could be done by physical connection to a DTU or by radio or GPS contact. The use of wire-line or radio linked blasters is also a practicable means of firing the SISS shots if these means are practicable in the particular area of survey. The SISS source may be monitored and recorded to allow quality assurance of its performance. Deviation from intended performance can be utilized to calculate corrections to NDAU drift calculations and applied after the NDAU data is compiled at the project HQ. If the source drift from an earlier SISS is communicated by a later SISS, the NDAU may perform this correction.

Where a Vibroseis source is chosen for both the SISS shots and for the production shots, SISS shots and production shots may overlap. This allows reduction of the recording time from what would be necessary if the two sources were triggered consecutively. Thus, this approach is particularly applicable to, and preferred for, the "paired-shot" method described above.

Figure 13:
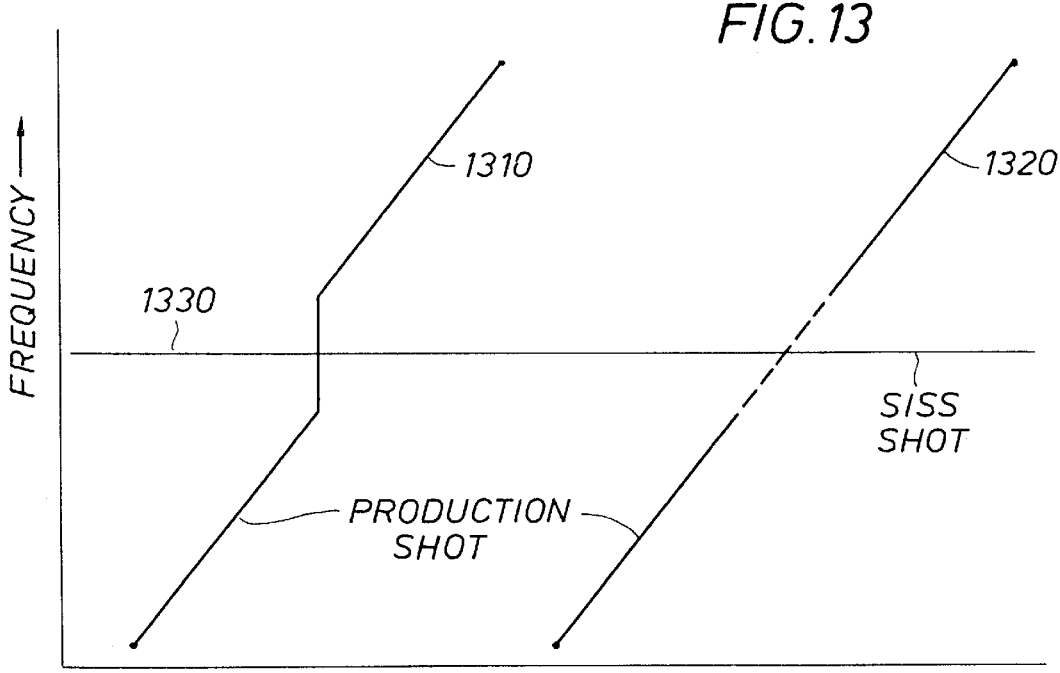
FIG. 13 is a time-frequency graph for overlapping SISS and production shot frequency sources.

Referring now to FIG. 13, when SISS shots and production shots overlap in this manner, it is preferred to employ a swept frequency band for the production shot and a single frequency for the SISS shot. That is, the fixed site SISS shots are specially designed to utilize a single frequency sweep (i.e. a mono-sweep) of long durations in lieu of a normal sweep that might be a linear sweep over several octaves. Rather than a single frequency, a narrow frequency band can also be employed. Much greater signal-to-noise ratio is obtained for the SISS shots at the selected frequency or frequency band than could be obtained at this frequency with a normal sweep. If the chosen frequency is very low, e.g. 10 Hz, attenuation is much less per unit distance. The high signal-to-noise ratio and low attenuation combine to give superior long distance communication and synchronization capability.

The production shots in tlis method also preferably are specially adapted for use with an SISS seismic exploration system. The production site sweep could be designed to avoid the frequency being used for the SISS shots by occupying a frequency outside the SISS frequency band. This improves the signal-to-noise ratio of each SISS shot. Alternatively, if overlapping spectra does occur, the sweep of the production shot can avoid the mono-frequency chosen for the SISS shots in two different ways. A first approach involves rapidly accelerating the production sweep 1310 past the frequency or frequency band of the SISS shots 1330. This increases the frequency rate of change for the production sweep in a range from the frequency just below that corresponding to the SISS shots to a frequency just above that corresponding to the SISS shots. This results in an extremely short amount of time spent vibrating in the narrow range of the SISS shot. The second approach utilizes an amplitude or notch filter for a production sweep 1320 to reduce the amplitude of the production sweep in a narrow range around the SISS shots.

Signal processing techniques can be employed to separate the two data sets contained in a combined recording. For example, a DFT (Discrete Fourier Transform) may be applied to the recording to derive amplitude and phase measurement for the fixed-site signal. For the production shot, a DFT is also used, with interpolation available to estimate the missing production signal at the SISS frequency. Alternatively, the FFT (Fast Fourier Transform) or other techniques may also be used. In some applications of impulsive production sources, such as airguns, a monofrequency Vibroseis source could be employed simultaneously using the methods described if degradations due to signal interference are acceptable.

In every application, the mono-frequency method limits, however, the time-shift of the SISS shots because of the difficulty in distinguishing during cross-correlation among peaks of equal or nearly equal amplitude. As such, time/phase shift is limited to 180 degrees maximum, similar to known phase shift keying modulation techniques. Clock drift and introduced error reduces the available time/phase shift to less than 180 degrees. As would be appreciated by one of ordinary skill in the art, this means that a low frequency provides greater time shift. When a low frequency such as 10 Hz is used, there is sufficient allowable time shift to compensate for possible clock drift and still communicate a low number of values or menu information, such as 4 binary bits of information. This is adequate to invoke one of a series of complex menus held by an NDAU. More complex information may be communicated by using consecutive sweeps, with each conveying a portion of a message.

Another method of sending complex messages using a mono-frequency SISS sweep is determining information based on the presence or absence of an SISS shot. Rather than phase shifting, at scheduled time the fixed-site mono-frequency Vibroseis source emits a sweep for a predetermined time (e.g. 20 seconds). This is interpreted by an NDAU as a "1". If no sweep is emitted at the scheduled time, the NDAU interprets this as a "0". A certain number of bits and corresponding total message time is scheduled in advance. One advantage of this approach is that while noise may disturb the phase and amplitude of the shot, as long as the shot (or lack thereof) is detected by the NDAUs a message can be conveyed. Correspondingly, this mono-frequency approach may be used where other communication protocols are infeasible due to noise or distance problems. Nevertheless. under more favorable noise conditions, the phase of the signal can also be used to convey information.

Yet another adaptation is to alternate the selected mono-frequency with a second frequency. The selected second frequency should also be low, but at a non-harmonic of the first frequency and preferably at the mid-octave position relative to the lower frequency. (e.g. 10 Hz and 15 Hz). The advantage of concentrating energy at a single frequency is slightly compromised, but this adaptation extends the useful phase range beyond one cycle. Pairs of sweeps may be combined to transmit information.

Referring to FIG. 4, in choosing a fixed site location 410 for the SISS source(s), some considerations include the expected coupling of the source at the chosen site, the proximity to the operation HQ, the distance to the furthest NDAU, potential for damage to existing facilities, the safety of the local populace and operations personnel, and environmental protection. There preferably is on-site presence and visual monitoring by the responsible SISS operations team prior to and during every SISS firing.

Although site 410 and 412 have been referred to as "fixed" sites, there is some allowable variation in the location of SISS shot generation from within a particular fixed site. Such variation allows for multiple sources, and thus the time constraints of consecutive SISS shots is more easily achieved. Multiple sources can be shot simultaneously, particularly for the calibration shot, to increase the signal strength.

The maximum distance between source units in a single fixed site is established by the requirement that the travel time to any NDAU receiver must not vary by more than one-half the SISS Unit Time Step less the maximum expected error in the peak time interpretation. For example, if the unit time step is 20 msec and the maximum error is 4 msec, then the travel time may vary by 6 msec. If the slowest energy of interest travels at 8 feet/msec, then the SISS source units could be separated in the direction of propagation a maximum of 48 feet. Further, this is a flexible maximum distance in the sense that the spacing of the source units may be increased by increasing the programmed unit time step. Ihowever, it should be noted that a more precise fixed site or some means to compensate for the error introduced by a non-exact fixed site (such as a predetermined source shot sequence and a corresponding preprogrammed NDAU) is preferred when the SISS shots are being used as synchronization or S/C shots.

When, due to the magnitude of the survey area, it is not feasible to use a single site for the SISS location throughout the entire project, it is necessary to utilize more than one site, such as fixed sites 410 and 412. This allows reduction of the maximum distance from the SISS source to the farthest NDAU. Multiple SISS source locations also may be advantageous because, for a given survey area, lower SISS source energy is required as compared to use of a single SISS source location because the newest fixed site may be positioned closer to the NDAU positions.

There are two envisioned implementations for multiple SISS source locations within a survey area. The first implementation conducts an initial phase of the project from a first location, moves the SISS location, and continues the project from a new SISS location. This may be repeated any number of times to allow surveys of any extent to be covered, as long as the entire NDAU set can always be reached from a single SISS location.

This first implementation allows a "roll along" SISS site that corresponds to the "swath" movement of a production operation. For example, a first fixed site for SISS generation could be established on the beginning of day one. At the end of day one, a second SISS fixed site could be established at a new location (e.g. the location of the last production shot of day one). Thus, this second SISS fixed site generates a calibration shot. Shortly thereafter (e.g., less than ten minutes when a TCXO is used) a synchronization shot or full SISS is generated at the first fixed site, thus accurately pinpointing the time of the calibration shot from the new site. Each recording is processed by the NDAUs to identify which calibration shot site was used and to compute drift using the first site. At the beginning of day two another SISS shot is generated at the second fixed site, allowing computation of overnight drift. This sequence may be continued throughout the production schedule.

The second embodiment utilizes more than one (widely separated) SISS location for simultaneous detonation of SISS shots from these locations. This allows good signal level throughout the area in which NDAUs are placed. These multiple sites may be constant for the project or may be varied as the survey progresses.

However, in any case, to ensure synchronization of the NDAUs, after each new SISS site has been established, an SISS is taken including this new site and dropping any sites to be abandoned. This SISS from the new site must include the initial calibration shot and any other shots required for enhancement of signal. Thereafter, at least one more SISS shot should be taken from the prior established SISS site. This final shot from the prior sites is taken as soon as feasible after the initial calibration shot from the new sites. The NDAU then processes the received wave-trains to provide synchronization and eliminate time drift. Interpolation or intelligent processing of the time drift determines the best estimate of the Master Clock time when the first SISS shot was taken at the new SISS site. The greater the time interval between the SISS at the old site and the calibration shot at the new site, the greater the time error which may be introduced in the calculation. Generally, an interval of less than ten minutes will keep the magnitude of the error to an acceptable level. In some cases, the last SISS may be conducted from the old site with the first calibration shot being made from the new site in the opposite order. In this case, extrapolation rather than interpolation, of the time drift correction is applied. A shorter interval between the two events is required to maintain the same degree of accuracy if extrapolation is used.

Other methods may be used to still further minimize the uncertainty that occurs from time drift of the NDAU clocks. For example, although the magnitude of clock drift may be determined with some precision at the time of a synchronization shot, production shots often occur between synchronization shots. Thus, a production shot may be remote in time from a synchronization shot and interpolation must then be used to estimate clock drift at the time of a production shot. While linear interpolation may be used, recordings of conditions proximate to the NDAU's may provide a correlation between some variable and the time drift of the NDAU's internal clock. For instance, temperature has been found to correlate to the extent of clock drift and large temperature deviations may cause an NDAU's clock to drift more quickly. Improved interpolation may thus be obtained by correlating an NDAU's clock temperature and clock drift. Time drift and temperature history can be utilized by each particular NDAU to perform an intelligent interpolation or prediction of the clock drift. A similar approach may be used to estimate the clock drift that may be present when a calibration shot is received by an NDAU. In addition, errors recorded at an HQ or remote site and introduced into measurements at the NDAUs may often be eliminated from the NDAUs' recordings upon subsequent processing.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims that follow, the scope of which shall include all equivalents of the subject matter of the claims.

TABLE 1

NSR General Menu Example

Novel Seismic Recorder General Menu Example

| Parameter Name | Symbol | Source | General Default | Allowed Values |
|---|---|---|---|---|
| Timing Shot | | SISS Shot 0 | No Default Allowed | |
| Project Name | PN | SISS Shot 1 or GD | Project Unidentified | List of 10 Projects |
| SISS Unit Time Step | UTS | SISS Shot 2 or GD | 0.050 | 0.005 to 0.5000 in steps of 0.025 |
| Listen Time | LT | SISS Shot 3 or GD | 12.000 | 0.500 to 25.000 in steps of 0.500 |
| Buffer Time | BT | SISS Shot 4 or GD | 8.000 | 0.500 to 25.000 in steps of 0.500 |
| Date of Next PTW | ZPTW | SISS Shot 5 or GD | Day 1 or OC 2 | Day 0 to 830 |
| Start Time of Next PTW | SPTW | SISS Shot 6 or GD | 8:00:00 AM or OC 481 | Minutes 0 to 1440 |
| Menu ID for Next PTW | PMID | SISS Shot 7 or GD | GMI | List of 200 Menus |
| Shooting interval | SI | SISS Shot 8 or GD | 120 seconds or OC 119 | Seconds 2 to 600 |
| Daily Shooting Start Time | ST | SSIS Shot 9 or GD | 7:00:00 AM or OC 43 | Deciminutes 0 to 144 |
| Daily Shooting End Time | ET | SISS Shot 10 or GD | 7:00:00 PM or OC 115 | Deciminutes 0 to 144 |
| Record Length | RL | SISS Shot 11 or GD | 7.0 seconds or OC 14 | 0.5 to 36.0 Seconds |
| Sample Period | SP | SISS Shot 12 or GD | 2 milliseconds or OC 3 | 50, 1, 2, 3, 4, 6 |
| K Gain | K | SISS Shot 13 or GD | 30 decibels or OC 2 | 24.30, 36, 42 |
| Calibration Site Change | SCCHANGE | SISS Shot 14 or GD | Defaults to No Change | 0 (no change) or 1 |
| Production Commo. SISS | PCSISS | SISS Shot 15 or GD | Defaults to Not Allowed | 0 (not allowed) or 1 |
| Parity | PAR | SISS Shot 16 or GD | No default is available | 1 to 3251 |
| SISS Record Duration | RD | | | 551.700 |
| NDAU Model Number | | General Menu | 1.2 KX Model 2 | 16 characters |
| NSR Software Version | | General Default | Version 2.0 | 16 characters |
| Client Identification | | General Default | Client Unidentified | 64 characters |
| Contractor identification | | General Default | Contractor ID | 64 characters |
| Receiver Types | RT | General Default | Receivers Unidentified | 64 characters |
| Source Types | | General Default | Source Unidentified | 64 characters |
| Auto Edit Shots On/Off | AEF | General Default | Perform Autoedit | 16 characters |
| Gain Mode for SISS DP | GM | General Default | Constant Gain | 16 characters |
| Back Up Mode | BUM | General Default | Use all parameters from OD | 32 characters |
| Other General Parameters | | General Menu | As defined | |

TABLE 1-continued

NSR General Menu Example
Novel Seismic Recorder
General Menu Example

| Parameter Name | PMD = GM1 Units | Ordinal Count | Cum. OC | Earliset S. Time | Latest S. Time |
|---|---|---|---|---|---|
| Timing Shot | | | | 0.000 | 0.000 |
| Project Name | alphanumeric | 10 | 10 | 12.000 | 12.500 |
| SISS Unit Time Step | seconds | 100 | 110 | 20.500 | 25.500 |
| Listen Time | seconds | 50 | 160 | 33.500 | 36.000 |
| Buffer Time | seconds | 50 | 210 | 86.000 | 84.500 |
| Date of Next PTW | days | 831 | 1041 | 96.500 | 138.050 |
| Start Time of Next PTW | minutes | 1441 | 2482 | 146.050 | 218.100 |
| Menu ID for Next PTW | alphanumeric | 200 | 2682 | 226.100 | 236.100 |
| Shooting interval | seconds | 599 | 3281 | 244.100 | 274.050 |
| Daily Shooting Start Time | ten minutes | 145 | 3426 | 282.050 | 288.300 |
| Daily Shooting End Time | ten minutes | 145 | 3571 | 297.300 | 304.550 |
| Record Length | Half seconds | 72 | 3643 | 312.500 | 316.150 |
| Sample Period | Milliseconds | 6 | 3649 | 324.150 | 324.450 |
| K Gain | Decibels | 4 | 3653 | 332.450 | 332.850 |
| Calibration Site Change | Binary Flag | 2 | 3655 | 332.450 | 332.860 |
| Production Commo. SISS | Binary Flag | 2 | 3657 | 348.750 | 348.850 |
| Parity | Ordinal Integer | 3657 | 7314 | 356.850 | 539.700 |
| SISS Record Duration | Seconds | 7314 | | | |
| NDAU Model Number | alphanumeric | | | | |
| NSR Software Version | alphanumeric | | | | |
| Client Identification | alphanumeric | | | | |
| Contractor identification | alphanumeric | | | | |
| Receiver Types | alphanumeric | | | | |
| Source Types | alphanumeric | | | | |
| Auto Edit Shots On/Off | alphanumeric | | | | |
| Gain Mode for SISS DP | alphanumeric | | | | |
| Back Up Mode | alphanumeric | | | | |
| Other General Parameters | | | | | |

TABLE 2

NSR Project Menu Example

Novel Seismic Recorder
General Menu Example

| Parameter Name | Symbol | Source | General Default | Allowed Values |
|---|---|---|---|---|
| | | SISS Shot 0 | | |
| Project Name | PN | Prospect Default | Alpine 3D | 64 characters |
| SISS Unit Time Step | UTS | Prospect Default | 0.020 | 0.005 to 0.500 |
| Listen Time | LT | Prospect Default | 10.000 | 0.500 to 25.000 |
| Buffer Time | BT | Prospect Default | 5.000 | 0.500 to 25.000 |
| Date of Next PTW | ZPTW | SISS Shot 1 or PD | Day 4 | Day 0 to 830 |
| Start Time of Next PTW | SPTW | SISS Shot 2 or PD | 601 | Minute 0 to 1440 |
| Menu ID for Next PTW | PMID | SISS Shot 3 or PD | PM1 | PM1 through PM6 |
| Shooting interval | SI | SISS Shot 4 or PD | 239 | Seconds 2 to 600 |
| Daily Shooting Start Time | ST | SISS Shot 5 or PD | 55 | Deciminutes 0 to 144 |
| Daily Shooting End Time | ET | SISS Shot 6 or Prior or PD | 103 | deciminutes 0 to 144 |
| Record Length | RL | SISS Shot 7 or Prior or PD | 9.0 | 0.5 to 36.0 Seconds |
| Sample Period | SP | SISS Shot 8 or Prior or PD | 3 | 50, 1, 2, 3, 4, 6 |
| K Gain | K | SISS Shot 9 or Prior or PD | 36 | 24, 30, 36, 42 |
| Calibration Site Change | SCCHANGE | SISS Shot 10 | Defaults to No Change | 0 (no change) or 1 |
| Parity | PAR | SISS Shot 11 | No default is available | 1 to 3251 |
| SISS Record Duration | RD | | | 200.120 |
| NDAU Model Number | | General Menu | 1.2 HX Model 2 | 16 characters |
| NSR Software Version | | Prospect Default | Version 2.0 | 16 characters |
| Client Identification | | Prospect Default | Black Gold, Inc. | 64 characters |
| Contractor identification | | Prospect Default | Roofing and Tooling, Inc. | 64 characters |
| Receiver Types | RT | Prospect Default | 6 ST 20 Geophones | 64 characters |
| Source Types | | Prospect Default | Airguns and Dynamite | 64 characters |
| Auto Edit Shots On/Off | AEF | Prospect Default | Perform Autoedit | 16 characters |
| Gain Mode for SISS DP | GM | Prospect Default | Constant Gain | 16 characters |
| Back Up Mode | BUM | Prospect Default | use all parameters | 32 characters |

TABLE 2-continued

NSR Project Menu Example
from PD
Novel Seismic Recorder
General Menu Example

| Parameter Name | PMD = GM1 Units | Ordinal Count | Cum. OC | Earliset S. Time | Latest S. Time |
|---|---|---|---|---|---|
| | | | 0.000 | 0.000 | |
| Project Name | alphanumeric | 0 | 0 | | |
| SISS Unit Time Step | seconds | 0 | 0 | | |
| Listen Time | seconds | 0 | 0 | | |
| Buffer Time | seconds | 0 | 0 | | |
| Date of Next PTW | days | 831 | 831 | 10.000 | 26.620 |
| Start Time of Next PTW | minutes | 1441 | 2272 | 31.620 | 60.440 |
| Menu ID for Next PTW | alphanumeric | 8 | 2280 | 65.440 | 65.600 |
| Shooting interval | seconds | 599 | 2879 | 70.600 | 82.500 |
| Daily Shooting Start Time | tenminutes | 145 | 3024 | 87.500 | 90.480 |
| Daily Shooting End Time | tenminutes | 145 | 3169 | 95.480 | 98.380 |
| Record Length | Halfseconds | 72 | 3241 | 103.380 | 104.820 |
| Sample Period | Milliseconds | 6 | 3247 | 109.820 | 108.940 |
| K Gain | Decibels | 4 | 3251 | 114.940 | 115.020 |
| Calibration Site Change | Binary Flag | 2 | 3253 | 120.020 | 120.000 |
| Parity | Ordinal Integer | 3253 | 6506 | 125.060 | 190.120 |
| SISS Record Duration | Seconds | 6506 | | | |
| NDAU Model Number | alphanumeric | | | | |
| NSR Software Version | alphanumeric | | | | |
| Client Identification | alphanumeric | | | | |
| Contractor identification | alphanumeric | | | | |
| Receiver Types | alphanumeric | | | | |
| Source Types | alphanumeric | | | | |
| Auto Edit Shots On/Off | alphanumeric | | | | |
| Gain Mode for SISS DP | alphanumeric | | | | |
| Back Up Mode | alphanumeric | | | | |

TABLE 3

NSR Set Menu, Example 1, Menu Definition

Set Menu, Example 1

| Parameter Name | Symbol | Source | Allowed Values | PMD = PM1 Units |
|---|---|---|---|---|
| Project Name | PN | SISS Shot 0 Project Default | Example Project 1 | alphanumeric |
| SISS Unit Time Step | UTS | Project Default | 0.020 | seconds |
| Listen Time | LT | Project Default | 10.000 | seconds |
| Buffer Time | BT | Project Default | 5.000 | seconds |
| Additional prospect - constant parameters will be carried in each set menu for that prospect | | | | |
| Date of Next PTW | ZPTW | SISS Shot 1 | Day 0 to 830 | days |
| Start Time of Next PTW | SPTW | SISS Shot 2 | Minute 0 to 1400 | minutes |
| Menu ID for Next PTW | PMID | SISS Shot 3 | PM1 through PM6 | alphanumeric |
| Shooting interval | SI | SISS Shot 4 | Seconds 2 to 600 | seconds |
| Daily Shooting Start Time | ST | SISS Shot 5 | Deciminutes 0 to 144 | ten minutes |
| Daily Shooting End Time | ET | SISS Shot 6 | Deciminutes 0 to 144 | ten minutes |
| Record Length | RL | SISS Shot 7 | 0.5 to 35.0 Seconds | Half seconds |
| Sample Period | SP | SISS Shot 8 | .50, 1, 2, 3, 4, 6 | Milliseconds |
| K Gain | K | SISS Shot 9 | 24, 30, 36, 52 | Decibels |
| Parity | PAR | SISS Shot 10 | 1 to 3251 | Ordinal Integer |
| SISS Record Duration | RD | | 195.040 | Seconds |

Set Menu, Example 1

| Parameter Name | Ordinal Count | Cum. OC | Earliest S. Time | Latest S. Time |
|---|---|---|---|---|
| | | | 0.000 | 0.000 |
| Project Name | 0 | 0 | | |
| SISS Unit Time Step | 0 | 0 | | |
| Listen Time | 0 | 0 | | |

TABLE 3-continued

NSR Set Menu, Example 1, Menu Definition

| | | | | |
|---|---|---|---|---|
| Buffer Time | | 0 | 0 | |
| Additional prospect - constant parameters will be carried in each set menu for that prospect | | | | |
| Date of Next PTW | | 831 | 831 | 10.000 | 26.620 |
| Start Time of Next PTW | | 1441 | 2272 | 31.620 | 60.440 |
| Menu ID for Next PTW | | 8 | 2280 | 65.440 | 65.600 |
| Shooting interval | | 599 | 2879 | 70.600 | 82.580 |
| Daily Shooting Start Time | | 145 | 3024 | 87.580 | 90.480 |
| Daily Shooting End Time | | 145 | 3169 | 95.480 | 98.380 |
| Record Length | | 72 | 3241 | 103.380 | 104.820 |
| Sample Period | | 6 | 3247 | 109.820 | 109.940 |
| K Gain | | 4 | 3251 | 114.940 | 115.020 |
| Parity | | 3251 | 6502 | 120.020 | 195.040 |
| SISS Record Duration | | 6502 | | | |

TABLE 4

NSR Set Menu, Example 1, Sample Application of Menu 1

Sample Application of Menu 1

| Parameter Name | Symbol | Source | Setting | Interpretation | Ordinal | S. Time |
|---|---|---|---|---|---|---|
| | | SISS Shot 0 | | | | 0.000 |
| Project Name | PN | Project Default | | | | |
| SISS Unit Time Step | UTS | Project Default | | | | |
| Listen Time | LT | Project Default | | | | |
| Buffer Time | BT | Project Default | | | | |
| Additional prospect-constant parameters will be carried in each set menu for that prospect | | | | | | |
| Date of Next PTW | ZPTW | SISS Shot 1 | Day 2 | Day after Tomorrow | 3 | 10.060 |
| Start time of Next PTW | SPTW | SISS Shot 2 | 479 minutes | 7:59:00 AM | 480 | 41.220 |
| Menu ID for Next PTW | PMID | SISS Shot 3 | PM2 | Set Menu PM2 | 2 | 65.480 |
| Shooting Interval | SI | SISS Shot 4 | 121 seconds | SI is 121 seconds | 120 | 73.000 |
| Daily Shooting Start Time | ST | SISS Shot 5 | 440 minutes | 7:20:00 AM | 45 | 88.480 |
| Daily Shootiong End Time | ET | SISS Shot 6 | 1160 minutes | 7:20:00 PM | 117 | 97.820 |
| Record Length | RL | SISS Shot 7 | 8.0 seconds | RL is 8.0 seconds | 16 | 103.700 |
| Sample Period | SP | SISS Shot 8 | 2 milliseconds | SP is 2 msec | 3 | 109.880 |
| K Gain | K | SISS Shot 9 | 30 decibels | K Gain is 30 db | 2 | 114.980 |
| Parity | PAR | SISS Shot 10 | 788 | Parity | 788 | 135.780 |
| SISS Record Duration | RD | | 195.040 seconds | | | |

TABLE 5

NSR Set Menu, Example 1, Sample of Decoding of SISS Shot Times
Sample of Decoding of SISS Shot Times

| Raw Times | Nearest Time in Mode | Delta to Model Times | Example 1 Corrected Times | Delta to Model Times | Ordinal Calc. | Setting Calc. | Interpretation |
|---|---|---|---|---|---|---|---|
| 0.002 | 0.000 | 0.002 | 0.000 | 0.000 | | | |
| 10.065 | 10.060 | 0.005 | 10.063 | 0.003 | 3 | Day 2 | Next PTW is Day after Tomorrow |
| 41.221 | 41.220 | 0.001 | 41.223 | 0.003 | 480 | 479 minutes | SPTW is 7:59:00 AM |
| 65.484 | 65.480 | 0.004 | 65.482 | 0.002 | 2 | PMS | Next Menu is PM2 |
| 73.002 | 73.000 | 0.002 | 73.000 | 0.000 | 120 | 121 seconds | SI is 12.1 seconds |
| 88.480 | 88.480 | 0.000 | 88.478 | −0.002 | 45 | 450 minutes | ST is 7:20:00 AM |
| 97.823 | 97.820 | 0.003 | 97.821 | 0.001 | 117 | 1450 minutes | ET is 7:20:00 PM |
| 103.704 | 103.700 | 0.004 | 103.702 | 0.002 | 16 | 8.0 seconds | RL is 6.0 seconds |
| 109.881 | 109.880 | 0.001 | 109.879 | −0.001 | 3 | 2 milliseconds | SP is 2 milliseconds |
| 114.979 | 114.980 | −0.001 | 114.977 | −0.003 | 2 | 30 decibels | K Gain is 30 db |
| 135.780 | 135.780 | 0.000 | 135.778 | −0.002 | 788 | Parity | Parity Checks OK |

TABLE 5-continued

NSR Set Menu, Example 1, Sample of Decoding of SISS Shot Times
Sample of Decoding of SISS Shot Times

| Raw Times | Nearest Time in Mode | Delta to Model Times | Example 1 Corrected Times | Delta to Model Times | Ordinal Calc. | Setting Calc. | Interpretation |
|---|---|---|---|---|---|---|---|
| | | 0.0019 Avg. Delta 1.9 msec DAU Time Drift | | 0.0006 Std. Dev. 0.6 msec | | 789 Parity Checks OK | |

TABLE 6

NSR Set Menu, Example 2, Menu Definition
Novel Seismic Recorder
Set Menu, Example 2

| Parameter Name | Symbol | Source | Allowed Values | PMID = PM2 Units | Ordinal Count | Cum. OC | Earliest S. Time | Latest S. Time |
|---|---|---|---|---|---|---|---|---|
| | | SISS Shot 0 | | | | | 0.000 | 0.000 |
| Project Name | PN | Project Default | Example Project 1 | alphanumeric | 0 | 0 | | |
| SISS Unit Time Step | UTS | Project Default | 0.020 | seconds | 0 | 0 | | |
| Listen Time | LT | Project Default | 10.000 | seconds | 0 | 0 | | |
| Buffer Time | BT | Project Default | 5.000 | seconds | 0 | 0 | | |
| Additional prospect-constant parameters will be carried in each set menu for that prospect | | | | | | | | |
| Date of Next PTW | ZPTW | SISS Shot 1 | Day 0 to 830 | days | 831 | 831 | 10.000 | 26.620 |
| Start time of Next PTW | SPTW | SISS Shot 2 | Minute 0 to 1440 | minutes | 1441 | 2272 | 31.620 | 60.440 |
| Menu ID for Next PTW | PMID | SISS Shot 3 | PM1 through PM8 | alphanumeric | 8 | 2280 | 65.440 | 65.600 |
| Shooting Interval | SI | SISS Shot 4 | Seconds 2 to 600 | seconds | 599 | 2879 | 70.600 | 72.580 |
| Daily Shooting Start Time | ST | SISS Shot 5 | Deciminutes 0 to 144 | ten minutes | 145 | 3024 | 87.580 | 90.480 |
| Daily Shooting End Time | ET | SISS Shot 6 | Deciminutes 0 to 144 | ten minutes | 145 | 3169 | 95.480 | 96.380 |
| Record Length | RL | Project Default | 18 | Half seconds | 0 | 3169 | | |
| Sample Period | SP | Project Default | 3 | Milliseconds | 0 | 3169 | | |
| K Gain | K | Project Default | 36 | Decibels | 0 | 3169 | | |
| Parity | PAR | SISS Shot 7 | 1 to 3169 | Ordinal Integer | 3169 | 6338 | 103.380 | 165.760 |
| SISS Record Duration | RD | | 176.760 | Seconds | | | | |

TABLE 7

NSR Set Menu, Example 2, Sample Application of Menu 2
Sample Application of Menu 2

| Parameter Name | Symbol | Source | Setting | Interpretation | Ordinal | S. Time |
|---|---|---|---|---|---|---|
| | | SISS Shot 0 | | | | 0.000 |
| Project Name | PN | Project Default | | | | |
| SISS Unit Time Step | UTS | Project Default | | | | |
| Listen Time | LT | Project Default | | | | |
| Buffer Time | BT | Project Default | | | | |
| Additional prospect-constant parameter will be carried in each set menu for that prospect | | | | | | |
| Date of Next PTW | ZPTW | SISS Shot 1 | 2 | Tomorrow | 2 | 10.040 |
| Start Time of Next PTW | SPTW | SISS Shot 2 | 479 minutes | 7:59:00 AM | 480 | 41.220 |
| Menu ID for Next PTW | PMID | SISS Shot 3 | PM3 | Next Menu is PM3 | 3 | 65.500 |
| Shooting Interval | SI | SISS Shot 4 | 181 seconds | SI is 181 secons | 180 | 74.200 |
| Daily Shooting Start Time | ST | SISS Shot 5 | 470 minutes | 7:50:00 AM | 48 | 88.540 |
| Daily Shooting End Time | ET | SISS Shot 6 | 1130 minutes | 6:50:00 PM | 114 | 97.760 |
| Record Length | RL | Project Default | | RL ts 9.0 seconds | | |
| Sample Period | SP | Project Default | | SP is 3 msec | | |
| K Gain | K | Project Default | | K Gain is 38 db | | |

TABLE 7-continued

NSR Set Menu, Example 2, Sample Application of Menu 2
Sample Application of Menu 2

| Parameter Name | Symbol | Source | Setting | Interpretation | Ordinal | S. Time |
|---|---|---|---|---|---|---|
| Partiy | PAR | SISS Shot 7 | 827 | Parity | 827 | 119.920 |
| SISS Record Duration | RD | | 176.760 seconds | | | |

TABLE 8

NSR Set Menu, Example 2, Sample Decoding of SISS Shot Times
Sample Decoding of SISS Shot Times

| Raw Times | Nearest Time in Mode | Delta to Model Times | Corrected Times | Delta to Model Times | Ordinal Calc. | Setting Calc. | Interpretation |
|---|---|---|---|---|---|---|---|
| 0.001 | 0.000 | 0.001 | 0.002 | 0.002 | | | |
| 10.039 | 10.040 | −0.001 | 10.040 | 0.000 | 2 | Day 1 | Next PTW is Tomorrow |
| 41.222 | 41.220 | 0.002 | 41.223 | 0.003 | 480 | 479 minutes | SPTW is 7:59:00 AM |
| 65.500 | 65.500 | 0.000 | 65.501 | 0.001 | 3 | PM3 | Next Menu is PM3 |
| 74.198 | 74.200 | −0.002 | 74.199 | −0.001 | 180 | 181 seconds | SI is 181 seconds |
| 88.539 | 88.540 | −0.001 | 88.540 | 0.000 | 48 | 470 minutes | ST is 7:50:00 AM |
| 97.757 | 97.760 | −0.003 | 97.758 | −0.002 | 114 | 1130 minutes | ET is 6:50:00 PM |
| | | | | | | | RL is 9.0 seconds |
| | | | | | | | SP is 3 msec |
| | | | | | | | K Gain is 36 db |
| 119.918 | 119.920 | −0.002 | 119.919 | −0.001 | 827 | Parity | Parity Checks OK |
| | | −0.0006 | | 0.0006 | | | |
| | | Avg. Delta is −0.6 msec | | Std Dev is 0.6 msec | 827 | | |
| | | Time Drift Estimate | | | | Parity Checks OK | |

TABLE 9

NSR Set Menu, Example 3, Menu Definition
Novel Seismic Recorder
Set Menu, Example 3

| Parameter Name | Symbol | Source | Allowed Values | PMID = PM3 Units | Ordinal Count | Cum. OC | Earliest S. Time | Latest S. Time |
|---|---|---|---|---|---|---|---|---|
| | | SISS Shot 0 | | | | | 0.000 | 0.000 |
| Project Name | PN | Project Default | Example Project 1 | alphanumeric | 0 | 0 | | |
| SISS Unit Time Step | UTS | Project Default | 0.020 | seconds | 0 | 0 | | |
| Listen Time | LT | Project Default | 10.000 | seconds | 0 | 0 | | |
| Buffer Time | BT | Project Default | 5.00 | seconds | 0 | 0 | | |
| Additional prospect-constant parameter will be carried in each set menu for that prospect | | | | | 0 | 0 | | |
| Date of Next PTW | ZPTW | SISS Shot 1 | Day 0 to 830 | days | 831 | 831 | 10.000 | 26.620 |
| Start Time of Next PTW | SPJW | SISS Shot 2 | Minute 0 to 1440 | minutes | 1441 | 2272 | 31.620 | 60.440 |
| Menu ID for Next PTW | PMID | SISS Shot 3 | PM1 through PM8 | alphanumeric | 8 | 2280 | 65.440 | 65.600 |
| Shooting Interval | SI | Default to Prior | Second 1 to 600 | seconds | 0 | 2280 | | |
| Daily Shooting Start Time | ST | Default to Prior | Deciminutes 0 to 144 | ten minutes | 0 | 2280 | | |
| Daily Shooting End Time | ET | Default to Prior | Deciminutes 0 to 144 | ten minutes | 0 | 2280 | | |
| Record Length | RL | Project Default | 18 | Half minutes | 0 | 2280 | | |
| Sample Period | SP | Project Default | 3 | Milliseconds | 0 | 2280 | | |
| K Gain | K | Project Default | 36 | Decibels | 0 | 2280 | | |
| Parity | PAR | SSIS Shot 4 | 1 to 2280 | Ordinal Integer | 2280 | 4560 | 70.600 | 116.200 |
| SISS Record Duration | RD | | 126 200 | Seconds | | | | |

TABLE 10

NSR Set Menu, Example 3, Sample Application of Menu 3
Sample Application of Menu 3

| Parameter Name | Symbol | Source | Setting | Interpretation | Ordinal | S. Time |
|---|---|---|---|---|---|---|
|  |  | SISS Shot 0 |  |  |  | 0.000 |
| Project Name | PN | Project Default |  |  |  |  |
| SISS Unit TIme Step | UTS | Project Default |  |  |  |  |
| Listen Time | LT | Project Default |  |  |  |  |
| Buffer Time | BT | Project Defauft |  |  |  |  |
| Additional prospect-constant parameters will be carried in each set menu for that prospect |  |  |  |  |  |  |
| Date of Next PTW | ZPTW | SISS Shot 1 | Day 1 | In one week | 8 | 10.160 |
| Start Time of Next PTW | SPTW | SISS Shot 2 | 479 minutes | 7:59:00 AM | 480 | 41.220 |
| Menu ID for Next PTW | PMID | SISS Shot 3 | PM6 | PM8 | 6 | 65.560 |
| Shooting Interval | SI | Default to Prior |  | 181 seconds |  |  |
| Daily Shooting Start Time | ST | Default to Prior |  | 7:50:00 AM |  |  |
| Daily Shooting End Time | ET | Default to Prior |  | 6:50:00 PM |  |  |
| Record Length | RL | Project Default |  | 9.0 sec |  |  |
| Sample Period | SP | Project Default |  | 3 milliseconds |  |  |
| K Gain | K | Project Default |  | 36 decibels |  |  |
| Parity | PAR | SISS Shot 4 | 494 | Parity | 494 | 80.480 |
| SISS Record Duration | RD |  | 126.200 seconds |  |  |  |

TABLE 11

NSR Set Menu, Example 3, Sample Decoding of SISS Shot Times
Sample Decoding of SISS Shot Times

| Raw Times | Nearest Time in Mode | Delta to Model Times | Corrected Times | Delta to Model Times | Ordinal Calc. | Setting Calc. | Interpretation |
|---|---|---|---|---|---|---|---|
| −0.008 | 0.000 | −0.008 | −0.004 | −0.004 |  |  |  |
| 10.155 | 10.160 | −0.006 | 10.159 | −0.001 | 8 | Day 7 | In One Week |
| 41.222 | 41.220 | 0.002 | 41.226 | 0.006 | 480 | 480 Minutes | SPTW is 8:00:00 AM |
| 65.556 | 65.560 | −0.004 | 65.560 | 0.000 | 6 | PMIS | Next Menu is PM6 |
|  |  |  |  |  |  |  | SI is 181 seconds |
|  |  |  |  |  |  |  | ST is 7:50:00 AM |
|  |  |  |  |  |  |  | ET is 6:50:00 PM |
|  |  |  |  |  |  |  | RL is 9.0 seconds |
|  |  |  |  |  |  |  | SP is 3 msec |
|  |  |  |  |  |  |  | K Gain is 36 db |
| 80.474 | 80.460 | −0.006 | 80.478 | −0.002 | 494 |  | Parity Check is OK |
|  |  | Avg. Delta is −4.2 msec |  | Std. Dev. 1.5 msec | 494 |  |  |
|  |  | DAU Time Drift Estimate |  |  | Parity Checks OK |  |  |

What is claimed is:

1. A method of field seismic data acquisition, comprising:
   (a) providing a series of nearly identical seismic shots from a fixed site, said series having at least first and second seismic shots;
   (b) receiving said first and second seismic shots signal trains at a seismic receiver remote from said fixed site; and
   (c) measuring the difference in arrival times between signal trains from said first and second seismic shots.

2. The method of claim 1, wherein said step of measuring includes comparing the signal trains of said first and second seismic shots.

3. The method of claim 1, wherein said seismic receiver is coupled to a data acquisition unit having a clock, said clock having a maximum expected time drift and wherein said fixed site has an area dependent upon said maximum expected time drift.

4. The method of claim 1, further comprising:
   (d) computing a clock drift period of a clock corresponding to said seismic receiver, said clock drift period being based on said measured difference in arrival times for signal trains from said first and second seismic shots and a predetermined difference in arrival times for said first and second seismic shot signal trains.

5. The method of claim 4, wherein said pre-determined difference is a preprogrammed interval in a data storage device associated with said seismic receiver.

6. The method of claim 1, wherein said first seismic shot is preceded by a quiescent time during which neither production shots nor SISS shots are generated.

7. The method of claim 1, further comprising:
   (d) computing a value corresponding to said measured difference in arrival times for said first and second seismic shots signal trains, said value being based on the magnitude of said measured difference in comparison with a set of pre-determined differences in arrival times for said first and said second seismic shot signal trains.

8. The method of claim 7, wherein said set includes an ordinal count number of possible values.

9. The method of claim 7, further comprising:
(e) determining a clock drift period based both on said measured difference in arrival times for said first and second seismic shot signal trains, and on one predetermined difference in arrival times of said set of predetermined differences in arrival times.

10. The method of claim 9 wherein said first and said second seismic shots are spaced by a buffer time.

11. The method of claim 7 further comprising:
(e) providing a third seismic shot preceding said first and second seismic shots, wherein said third seismic shot transmits only synchronization data.

12. The method of claim 9 further comprising:
(f) providing a third seismic shot preceding said first and second seismic shots, wherein said third seismic shot transmits only synchronization data.

13. The method of claim 1, wherein said series of nearly identical shots is interspersed with production shots, and wherein each production shot is accompanied by a corresponding shot of said series of nearly identical shots.

14. The method of claim 13, wherein said production shots and said shots of said nearly identical series of shots are all produced by vibrating seismic sources, and wherein said production shots and said series shots overlap with said production shots being a multi-frequency sweep and said series shots being approximately at a mono-frequency.

15. The method of claim 3, wherein said data acquisition unit has a power conservation mode, and wherein said data acquisition unit is not in said power conservation mode for at least a maximum clock drift period prior to the targeted arrival time for said second seismic shot.

16. The method of claim 7 wherein said seismic receiver is associated with a data acquisition unit, said data acquisition unit having a clock subject to a maximum clock drift, said set of predetermined differences in arrival times comprising a number of target shot times, with each target shot time being spaced from its neighbor at least twice said maximum clock drift.

17. The method of claim 16 wherein each target shot time is an integer multiple of a unit time step.

18. The method of claim 1 wherein said fixed site is movable.

19. The method of claim 1 wherein said first seismic shot is provided at a first time proximate to a first predetermined shot generation time and said second seismic shot is provided at a second time proximate to a second predetermined shot generation time, said seismic receiver being associated with a clock having a corresponding clock drift, said method further comprising:
(d) correcting said clock drift period based on a magnitude between said second time and said second predetermined shot generation time.

20. The method of claim 1 wherein each shot is generated by a fixed site source unit, said fixed site source unit relying on an associated high-accuracy clock to time the generation of each of said shots.

21. The method of claim 7, wherein said value corresponds to an instruction for a processor.

22. The method of claim 1, wherein said method of field seismic data acquisition is also a method of seismic exploration, and further wherein said seismic receiver attaches to a data acquisition unit, said data acquisition unit comprising:

a clock;
a processor associated with said clock.

23. The method of claim 1, wherein said providing step also includes the provision of a third seismic shot, said third seismic shot being a parity shot.

24. A seismic data acquisition system, comprising:
at least one seismic source suitable for generation of a plurality of nearly identical seismic shots, said plurality of seismic shots being spaced in time from one another;
a seismic receiver suitable for reception of said seismic shots and further suitable for electrical generation of waveforms corresponding to said seismic shots;
a processor programmable to compare said waveforms from said seismic receiver, said comparison by said processor establishing a magnitude of said time spacing between selected pairs of said seismic shots.

25. The system of claim 24, further comprising:
a clock attached to said processor, said processor resynchronizing said clock based upon said magnitude of said time spacing.

26. The system of claim 24, wherein said processor is located at a headquarter site.

27. The system of claim 26, wherein said processor improves said establishing of said magnitude by adjusting said magnitude in reliance upon known errors other than clock drift associated with said seismic shots.

28. The system of claim 24, wherein said processor is housed in a data acquisition unit, said data acquisition unit further comprising:
a clock providing temporal data, said clock attached to said processor, wherein said processor correlates said waveforms and said temporal data.

29. The system of claim 28, wherein said data acquisition unit further comprises:
memory suitable for storage of selected ones of said waveforms and further suitable for storage of a plurality of commands;
wherein said processor uses said temporal data associated with said waveforms to select and execute at least one of said plurality of commands.

30. The system of claim 29 wherein said plurality of commands are organized in a plurality of command Menus, one of said commands switching from a first of said menus to a second of said menus.

31. The system of claim 24, wherein said processor is a means for comparing seismic shot waveforms to establish a time difference between and among two or more of said seismic shot waveforms.

32. The means for comparing of claim 31, wherein said means for comparing executes commands based upon said time difference.

33. The system of claim 24, wherein said seismic receiver includes a micro-hydrogenerator suitable for placement in a dynamic aquatic environment.

34. The method of claim 1, wherein said first seismic shot is a calibration shot, said second seismic shot being about a predetermined time delay after said calibration shot.

35. The method of claim 1, wherein at least one of said series of nearly identical seismic shots is provided by a seismic source, said seismic source not being connected physically to said seismic receiver.

36. The method of claim 13, wherein said production shots are provided during predetermined production period and further wherein said series of nearly identical seismic shots are provided during predetermined periods allocated to the series of nearly identical seismic shots.

37. The method of claim 3, wherein said series of nearly identical shots including a third seismic shot, said first, second, and third seismic shots each being used to identify said clock drift.

38. The method of claim 21, wherein said processor changes operation based on said instruction.

* * * * *